United States Patent
Kadowaki et al.

(10) Patent No.: US 10,185,172 B2
(45) Date of Patent: Jan. 22, 2019

(54) METHOD OF DRIVING DISPLAY DEVICE AND METHOD OF PRODUCING DISPLAY DEVICE

(71) Applicant: Sharp Kabushiki Kaisha, Sakai, Osaka (JP)

(72) Inventors: Shinya Kadowaki, Sakai (JP); Hidefumi Yoshida, Sakai (JP); Ryuzo Yuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/577,032

(22) PCT Filed: May 20, 2016

(86) PCT No.: PCT/JP2016/064991
§ 371 (c)(1),
(2) Date: Nov. 27, 2017

(87) PCT Pub. No.: WO2016/190233
PCT Pub. Date: Dec. 1, 2016

(65) Prior Publication Data
US 2018/0143486 A1 May 24, 2018

(30) Foreign Application Priority Data
May 28, 2015 (JP) ................. 2015-108643

(51) Int. Cl.
G02F 1/1335 (2006.01)
G02F 1/133 (2006.01)
G02F 1/1333 (2006.01)
G09F 9/30 (2006.01)
G02F 1/1339 (2006.01)

(52) U.S. Cl.
CPC ........ *G02F 1/133512* (2013.01); *G02F 1/133* (2013.01); *G02F 1/1333* (2013.01); *G02F 1/1335* (2013.01); *G02F 1/1339* (2013.01); *G02F 1/133514* (2013.01); *G09F 9/30* (2013.01)

(58) Field of Classification Search
None
See application file for complete search history.

(56) References Cited

U.S. PATENT DOCUMENTS

2004/0135941 A1   7/2004  Nam et al.
2006/0221027 A1*  10/2006 Ishihara ............ G02F 1/133512
                                                        345/88

FOREIGN PATENT DOCUMENTS

JP        2004-310038 A     11/2004

* cited by examiner

*Primary Examiner* — Thanh-Nhan P Nguyen
(74) *Attorney, Agent, or Firm* — Keating & Bennett, LLP

(57) ABSTRACT

A method of driving a display device including a display panel that includes a color filter board is provided. The color filter board includes a light blocking section formed in a grid and color sections that are formed in areas surrounded by a pattern of the light blocking section in different colors from area to area. The color sections form display pixels on a combination basis. The display panel includes a light blocking area in at least a section of an edge along an outline of the display panel. The method includes setting the color sections that do not form the display pixels among the color sections adjacent to the light blocking area in a plan view of the display panel constantly in the black state.

7 Claims, 23 Drawing Sheets

FIG.1
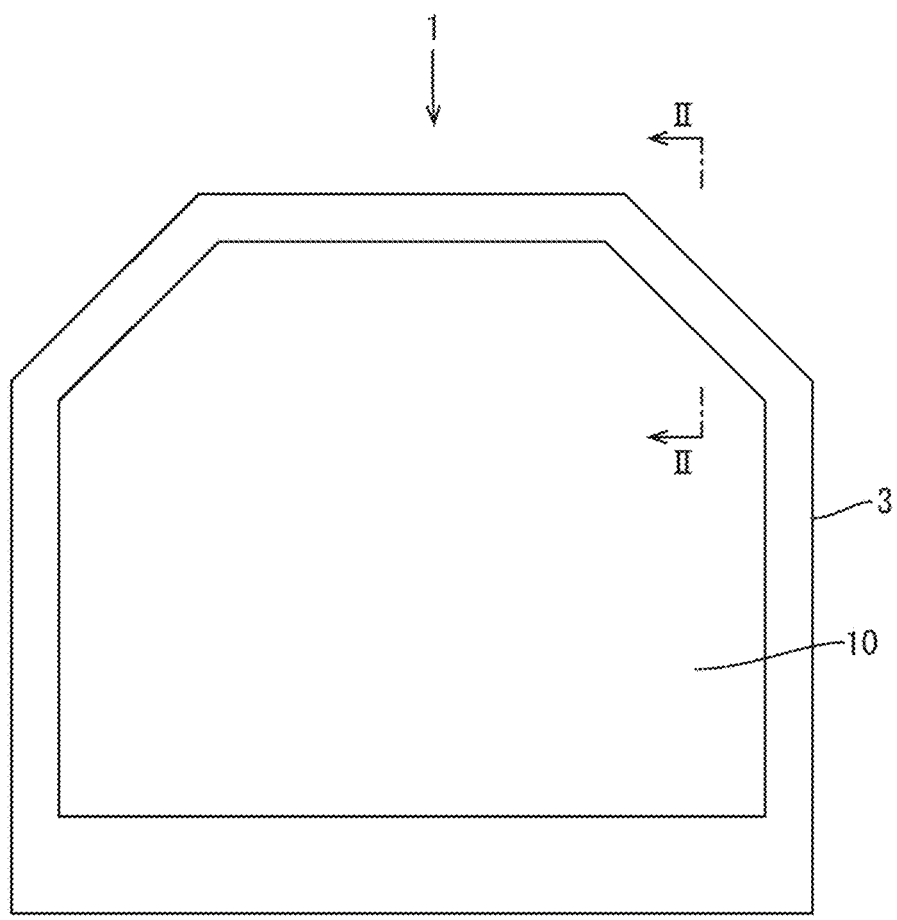
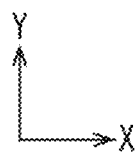

METHOD OF DRIVING DISPLAY DEVICE AND METHOD OF PRODUCING DISPLAY DEVICE

TECHNICAL FIELD

The present invention relates to a method of driving display device and a method of producing a display device.

BACKGROUND ART

A known display device includes a display panel that includes a color filter board. The color filter board includes a substrate on which a light blocking section and color sections in multiple colors are formed. Each set of color sections in different colors forms one display pixel. In the display device of this kind, a light leakage may occur at a boundary between a display area and a frame area that surrounds the display area on a panel surface of a display panel. This may reduce display quality of the display device. Patent Document 1 discloses a liquid crystal display device in which a light leakage from a display panel is reduced and display characteristics of the display device are improved.

In the liquid crystal display device disclosed in Patent Document 1, a light blocking tape is bonded to the frame area of the display panel along an outline of the display panel. Furthermore, a black matrix is formed in an entire overlapping area of the color filter board overlapping the frame area along the outline through patterning. The light blocking tape and the black matrix form a light blocking area. In the liquid crystal display device, the light blocking tape and the light blocking tape reduce a light leakage at the boundary of the display panel.

RELATED ART DOCUMENT

Patent Document

Patent Document 1: Unexamined Japanese Patent Application Publication No. 2004-310038

Problem to be Solved by the Invention

Display panels included in display devices generally have rectangular or square shapes in a plan view. Recently, most of frame sections of display panels are processable. Display panels with various outlines in a plan view including semicircular outlines and trapezoidal outlines have been produced. In a production process of the display panels with different types of outlines, a photo mask is required for each outline type to form the black matrix according to the outline type in an entire frame area.

Because photo masks are very expensive, a production cost of the display panels increases if photo masks are prepared for different outline types of display panels, respectively. If it is not necessary to form the black matrix in the entire frame area of each display panel through patterning, a display panel in a rectangular or a square shape may be produced using a general photo mask and cut along a requested outline. According to the configuration, display panels with requested outlines can be produced without an increase in the number of required photo masks.

If the display panels with the requested outlines are produced without forming the black matrixes in the entire frame areas of the display panels through patterning, light blocking tapes bonded to the frame areas of the display panels may not be able to sufficiently reduce light leakages from the frame areas of the display panels and therearound. Furthermore, some of the color sections of display pixels may overlap the light blocking tapes bonded to the frame areas of the display panels. The display pixels overlapping the light blocking tapes and adjacent display pixels may exhibit improper colors that are out of the proper chromaticity range during driving of the display devices. Namely, the display pixels do not properly function resulting in a decrease in display quality of the display devices.

DISCLOSURE OF THE PRESENT INVENTION

The technology disclosed herein was made in view of the above circumstances. An object is to provide a display device with a requested outline while reducing a production cost and restricting a decrease in display quality.

Means for Solving the Problem

A technology disclosed herein is a method of driving a display device including a display panel including a color filter board. The color filter board includes a light blocking section formed in a grid and multiple colors of color sections formed in areas surrounded by a pattern of the light blocking section in different colors from area to area. Sets of the color sections in different colors form display pixels, respectively. The display panel includes a light blocking area formed in at least a section of an edge of the display panel along an outline of the display panel. The method includes setting the color sections not forming the display pixels among the color sections adjacent to the light blocking area constantly in a black state. The color sections adjacent to the light blocking area include not only those adjacent to the light blocking area but also the color sections overlapping the light blocking area in a plan view.

In the display device driven by the above driving method, the light blocking area is formed at least the section of the edge along the outline of the display panel, that is, at least a section of a frame area of a panel surface of the display panel. In the method of driving the display device described above, the color section that do not form the display pixels among the color section adjacent to the light blocking area are set constantly in the black state. In addition to the light blocking in the light blocking area, with at least some of the color sections adjacent to the light blocking area are set in the black state, light leakages from areas of the display panel adjacent to the frame area can be effectively reduced.

Even if the display panel is produced without patterning of a black matrix in an entire frame area of the display panel, with at least some of the color sections adjacent to the light blocking area set constantly in the black state, the display pixels overlapping the light blocking area and display pixels therearound are less likely to exhibit display colors that are out of the proper chromaticity range and tinted during driving of the display device. The display panel may be formed in a rectangular shape or a square shape using a general photo mask and cut along a requested outline. According to this method, the display panel having the requested outline can be produced without an increase in the number of required photo masks and the display pixels overlapping the light blocking area and the display pixels therearound are less likely to be colored. Therefore, the production cost can be reduced and the display device with the requested outline can be provided without a decrease in the display quality.

In the driving method, the light blocking area of the display device may be formed by bonding a light blocking member to a section of a panel surface of the display panel overlapping the light blocking area in a thickness direction of the display panel.

In the display device driven by the driving method, the light blocking area may be formed by bonding a light blocking member such as a light blocking tape to a section of the display panel in a process of producing the display device. A detailed configuration for forming the light blocking area in the display device can be provided.

In the driving method, the light blocking area of the display device may be formed by disposing the light blocking section in an area of the color filter board overlapping the light blocking area in the thickness direction of the display panel.

In the display device driven by the driving method, the light blocking area of the display device may be formed by disposing a black matrix in a section of the color filter board overlapping the light blocking area in the thickness direction of the display panel through patterning in a production process of the display panel. According to this method, the light blocking area can be formed without bonding the light blocking tape to the display panel. A detailed configuration for forming the light blocking area in the display device can be provided.

In the driving method, the display panel may include the color filter board, an array board including thin film transistors, and a liquid crystal layer between the color filter board and the array board. The display device may include a voltage applying section configured to apply a voltage to the liquid crystal layer and a voltage controlling section configured to control the voltage. Transmissivity of a section of the liquid crystal layer overlapping the color sections in the black state in a thickness direction of the display panel may be minimized by applying a voltage to the liquid crystal layer by the voltage applying section and by controlling the voltage applied to the section by the voltage control section.

According to the driving method, in the liquid crystal panel that is a display panel including the liquid crystal layer between the color filter board and the array board, an orientational state of the liquid crystal layer is controlled by the voltage applying section and the voltage controlling section to minimize the transmissivity of the section of the liquid crystal layer and set the color sections overlapping the section constantly in the black state. A detailed configuration for setting the color sections that do not form the display pixels constantly in the black state is provided.

When a maximum angle among angles relative to a line normal to a panel surface of the display panel at which a displayed image can be viewed is defined as θ, a width of a section of a black state area not overlapping the light blocking area in the thickness direction of the display panel is defined as W1, a width of the black state area is defined as W2, and a refractive index and the thickness of the array board are defined as N and T1, respectively, the display panel may be prepared such that the following formulas (1) and (2) are satisfied:

$$W1 \geq T1 \cdot \tan(\sin^{-1}(\sin \theta / N)) \quad (1)$$

$$W2 \geq 2 \cdot W1 \quad (2)$$

In the display device driven by the driving method, when arrangement conditions of the light blocking area and the color sections that are in the black state in the display device satisfy the above formulas (1) and (2), light passes the liquid crystal panel such that the display pixels overlapping the light blocking area and the display pixels therearound are less likely to exhibit display colors that are out of the proper chromaticity range and tinted during driving of the display device while the light leakage from the display panel is restricted. Detailed settings regarding the arrangement conditions of the light blocking area and the color sections that are in the black state can be provided.

Another technology disclosed herein is a method of producing the display device driven by the driving method described above. The method includes a removing process including applying a laser beam to a section of a substrate included in the color filter board to remove the color sections formed in the section of the substrate to which the laser beam is applied among the color sections formed on the substrate.

In the production process of the display device, to bond the color filter board to another board, a sealant may be used for bonding the boards together. Such a sealant may be made of thermosetting resin or photo curable resin and thus adhesion of the sealant to a glass substrate may be higher than to the color sections.

In the production method of the display device, in the production process of the display device, when the glass substrate is used as a substrate of the color filter board and the sealant is used for bonding the color filter board to other board, the color sections in the area of the color filter board overlapping the sealant are removed in the removing process before applying the sealant. When the color filter board is bonded to the other board using the sealant, the sealant is in close contact with the glass substrate without the color sections therebetween. In comparison to a configuration in which the color sections are provided between the sealant and the glass substrate, the adhesion of the sealant to the glass substrate increases. Therefore, a decrease in removal strength between the color filter board and the other board is less likely to occur in the produced display panel.

Another technology disclosed herein is a method of producing the display device driven by the method of driving the display device. The method includes a bonding process and a cutting process. The bonding process includes bonding the color filter board and the array board with a sealant. The cutting process is performed after the bonding process. The cutting process includes cutting lines for driving the thin film transistor by applying a laser beam to the lines and moving the laser beam at least in a section of the array board of a bonded board between a profile line of the display panel to form an outline of the display panel to be produced and the sealant.

In the production process of the display device, in the cutting process, the lines in the area of the array board between the profile line to form the outline of the display panel and the sealant are cut along the outline. When sectioning the bonded board along the outline of the display panel to be produced after the cutting process, the lines outside the sealant are less likely to develop a short circuit. Therefore, the display device with the required outline can be produced white reducing the production cost and restricting the decrease in the display quality.

Another technology disclosed herein is a method of producing the display device driven by the method of driving the display device. The method includes a cutting process and a bonding process. The cutting process includes cutting lines for driving the thin film transistors by applying a laser beam to the lines and moving the laser beam at least in a section inside a profile line along an outline of the display panel to be produced. The bonding process is performed after the cutting process. The bonding process includes preparing a bonded board by applying a sealant onto the array board to cover cut end surfaces of the lines that are cut in the cutting process and bonding the color filter board and array board together with the sealant.

In the production method of the display device, prior to the bonding process, the cutting process is performed for cutting the lines that are located in the area of the array board inside the profile line along the outline of the display panel to be produced. In the bonding process, the sealant is applied to cover the cut end surfaces of the lines that are cut in the cutting process. Even if moisture enters the array board, the cut end surfaces of the lines are protected from erosion by the sealant. Therefore, a decrease in quality reliability is less likely to occur. According to the production method, the decrease in the quality reliability is less likely to occur while restricting the short circuit between lines located outside the sealant.

The production method of the display device may further include a pattern forming process including forming a thin film pattern of gate lines including gate electrodes of the thin film transistors, a thin film pattern of source lines including source electrodes of the thin film transistors, and a thin film pattern of planar electrodes having a planar shape and being opposed to the gate lines and the source lines in a thickness direction of the array board via an insulating film. In the pattern forming process, the thin film pattern of the planar electrodes may be formed while a first non-overlapping area in which the source lines do not overlap the planar electrodes in a thickness direction of the array board of the section in which the source lines are disposed and a second non-overlapping area in which the gate lines do not overlap the planar electrodes in the thickness direction of the array board of the section in which the gate lines are disposed are maintained. The source lines and the gate lines may be the lines cut in the cutting process. In the cutting process, the laser beam may be moved in a scan path to pass the first non-overlapping area to cut the source lines and to pass the second non-overlapping area to cut the gate lines.

In the cutting process, an instantaneous drop may occur in output of the laser beam in some areas according to positions at which the laser beam is applied or variation in output of the laser beam. In the configuration in which the planar electrodes are formed on the array board to face the gate lines and the source lines via the insulating film, sections of the gate lines and the source lines located in the areas in which the output of the laser beam has been dropped may be only melted but not cut during the cutting of the gate lines and the source lines with the laser beam. A short circuit may be developed between the common electrode and the gate lines or the source lines resulting in a decrease in quality reliability of the display device to be produced. In the production method of the display device described above, the laser beam is applied and moved in the scan path to pass the first non-overlapping area to cut the source lines and to pass the second non-overlapping area to cut the gate lines. Therefore, even if the lines are melted during cutting the gate lines and the source lines by the laser beam, the lines and the planar electrodes are less likely to develop a short circuit. The decrease in the quality reliability due to the short circuit between the lines and the planar electrodes is restricted while the lines outside the sealant are restricted from developing the short circuit.

Advantageous Effect of the Invention

According to the technology described herein, a display device with a requested outline can be provided while reducing a production cost and restricting a decrease in display quality.

BRIEF DESCRIPTION OF THE DRAWINGS

FIG. 1 is a schematic plan view of a liquid crystal display device according to a first embodiment.

FIG. 8 is a plan view illustrating the boundary between the section of the frame area at the panel sloped side and the display area when the liquid crystal panel is turned on.

MODE FOR CARRYING OUT THE INVENTION

First Embodiment

Figure 2:
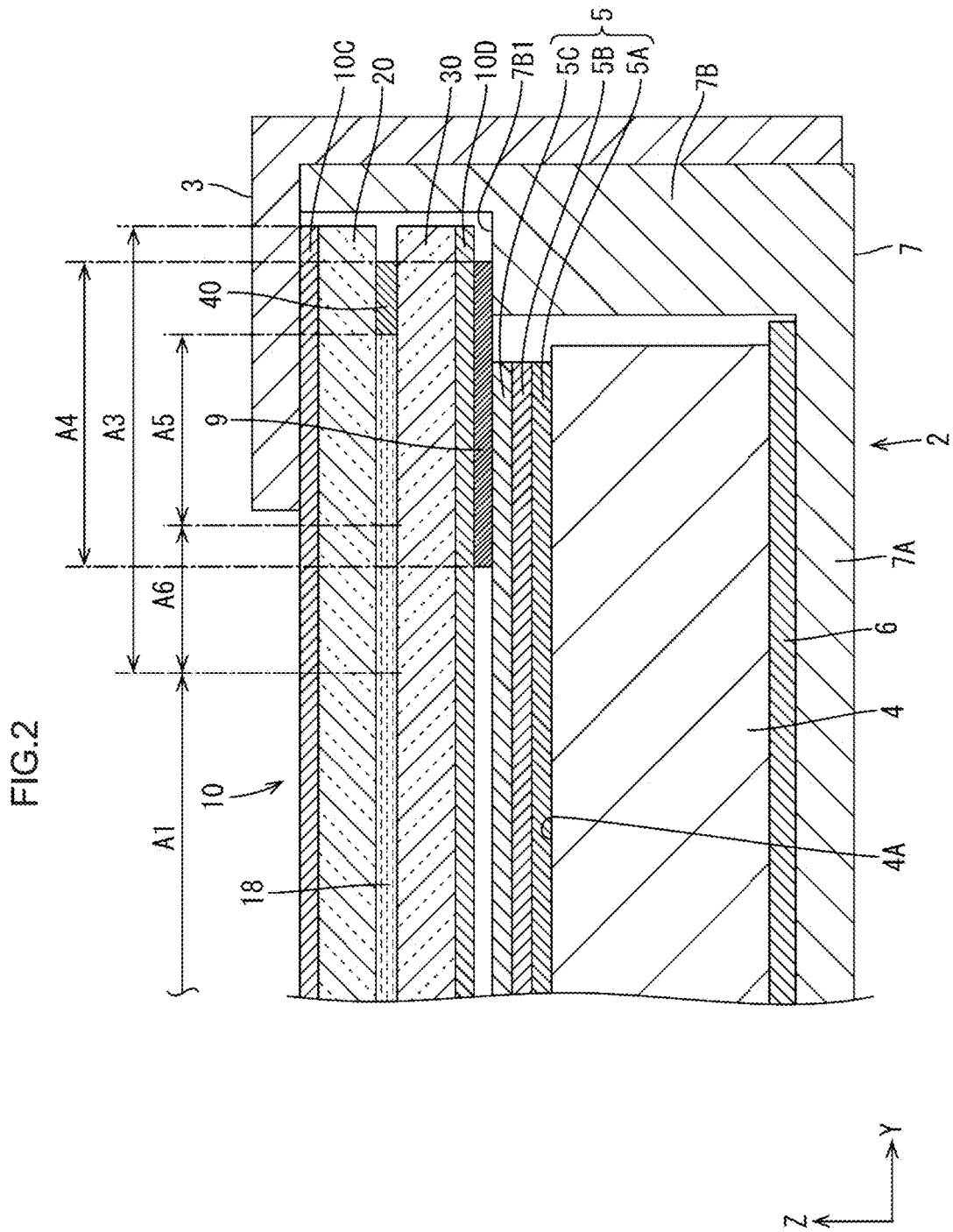
FIG. 2 is a schematic cross-sectional view of the liquid crystal display device illustrating a cross-sectional configuration thereof along a II-II plane in FIG. 1.

The first embodiment of the present invention will be described with reference to FIGS. 1 to 15. In this section, a liquid crystal display device 1 including a liquid crystal panel 10*a* as illustrated in FIG. 1 will be described. X-axes, Y-axes, and Z-axes may be provided in the drawings. The axes in each drawing correspond to the respective axes in other drawings to indicate the respective directions. An upper side in each drawing illustrating the cross-sectional view corresponds to an upper side (a front side) of the liquid crystal display device 1 (or the liquid crystal panel 10).

The liquid crystal display device described in this section has a hexagonal outer shape with inequality angles in a plan view, which is not a regular rectangular or square shape. Specifically, as illustrated in FIG. 1, the liquid crystal display device 1 has a hexagonal shape with two corners on the lower side in FIG. 1 at an angle of about 90 degrees and four corners at an angle of about 135 degrees. Two sides of the outer shape of the liquid crystal display device 1 extend in the Y-axis direction, another two sides extend in the Y-axis direction, and the rest of two sides extend in directions angled to the X-axis direction and the Y-axis direction.

As illustrated in FIGS. 1 and 2, the liquid crystal display device 1 includes a backlight unit 2 that is an external light source and a liquid crystal panel 10. The backlight unit 2 and the liquid crystal panel 10 are integrally held with a bezel having a frame shape. In the liquid crystal display device 1, the liquid crystal panel 10 is fixed in a position with a display surface for displaying images facing the front side. The backlight unit 2 is disposed behind the liquid crystal panel and fixed. The backlight unit 2 supplies light to the liquid crystal panel 10.

First, the backlight unit 2 will be briefly described. As illustrated in FIG. 2, the backlight unit 2 includes at least a light guide plate 4, an optical sheet set 5, a reflection sheet 6, a light source, and a chassis 7. The optical sheet set 5 is placed on a surface of the light guide plate 4. The reflection sheet 6 is disposed behind the light guide plate 4. The light source, which is not illustrated, is opposed to at least one of end surfaces of the light guide plate 4. The chassis 7 has a box shape and forms a rear exterior of the backlight unit 2. The chassis 7 holds the above components therein. The backlight unit 2 according to this embodiment is so-called edge light type backlight in which light from the light source enters the light guide plate 4 through a light entering surface in the end surface.

The light guide plate 4 is made of synthetic resin having high light transmissivity. The light guide plate 4 has a plate shape with a large thickness. A surface of the light guide plate 4 is configured as a light exiting surface 4A. The optical sheet set 5 has a function for passing light rays exiting from the light guide plate 4 and exerting predefined optical effects on the transmitting light rays. The optical sheet set 5 includes a diffuser sheet 5A, a lens sheet 5B, and a reflective type polarizing sheet 5C disposed in layers in this sequence from the surface of the light guide plate 4 (the light exiting surface 4A). The reflection sheet 6 is made of synthetic resin and has a white surface having high light reflectivity. The reflection sheet 6 is sandwiched between the light guide plate 4 and a bottom plate 7A of the chassis 7 to reflect light rays leaking from the back surface side of light guide plate 4.

The chassis 7 is formed from a metal sheet such as an aluminum sheet and an electro galvanized steel sheet (SECC). As illustrated in FIG. 2, the chassis 7 includes the bottom plate 7A and sidewalls 7B that rise frontward from edges of the bottom plate 7A. The sidewalls 7B include steps 7B1 in the vertical direction on inner surfaces (surfaces facing the light guide plate 4) at a position in the height direction the same as the top surface of the optical sheet set 5. Light blocking tapes 9 are bonded to top surfaces of the steps 7B1 and edges of the optical sheet set 5 to cross borders therebetween. The light blocking tapes 9 include adhesive front and back surfaces. The light blocking tapes 9 are entirely in black to have light blocking properties and disposed to form a frame shape along the outline of the liquid crystal display device 1.

Figure 3:
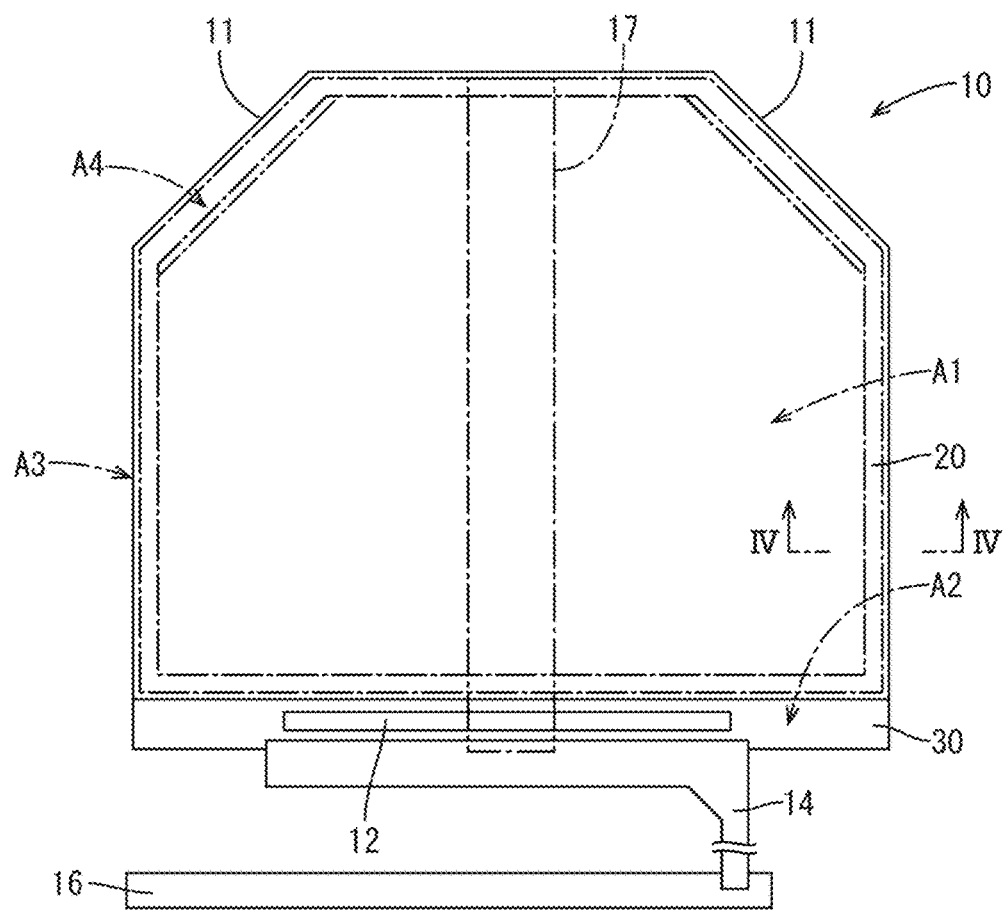
FIG. 3 is a schematic cross-sectional view of a liquid crystal panel.

Next, the configuration of the liquid crystal panel 10 will be described in detail. As illustrated in FIG. 3, the liquid crystal panel 10 described in this section has an outer shape in a plan view similar to the outer shape of the liquid crystal display device 1. Sloped sides of the outline of the liquid crystal panel 10 extending in directions at angles to the X-axis direction and the Y-axis direction may be referred to as panel sloped sides 11 hereinafter. As illustrated in FIG. 3, the liquid crystal panel 10 includes a display area A1 that takes up a large part thereof in which images are displayed and a non-display area A2 outside the display area A1 in which images are not displayed. A frame shaped section of the non-display area A1 surrounding the display area A1 is referred to as a frame area A3 of the liquid crystal panel 10. Sections of the frame area A3 of the liquid crystal panel 10 overlapping the light blocking tapes 9 in the vertical direction (the thickness direction of the liquid crystal panel 10) are referred to as a light blocking area A4.

At a position closer to the edge of the liquid crystal panel 10 in the Y-axis direction (on the lower side in FIG. 3) in a section of the non-display area A2 of the liquid crystal panel 10, an IC chip 12 and a flexible circuit board 14 are mounted. The IC chip 12 is an electronic component for driving the liquid crystal panel 10. The flexible circuit board 14 is a circuit board for connecting a control circuit board 16 (an example of a voltage controlling section) to the liquid crystal panel 10. The control circuit board 16 is configured to supply various kinds of input signals to the IC chip 12 from the outside. In this embodiment, a gate driver 17 for driving the TFTs 32, which will be describe later, is disposed at about the center of the back surface of the liquid crystal panel 10. Because the gate driver 17 is disposed at the position, most section of the edges of the liquid crystal panel 10 is processable in a liquid crystal panel producing process, which will be describe later.

Figure 4:
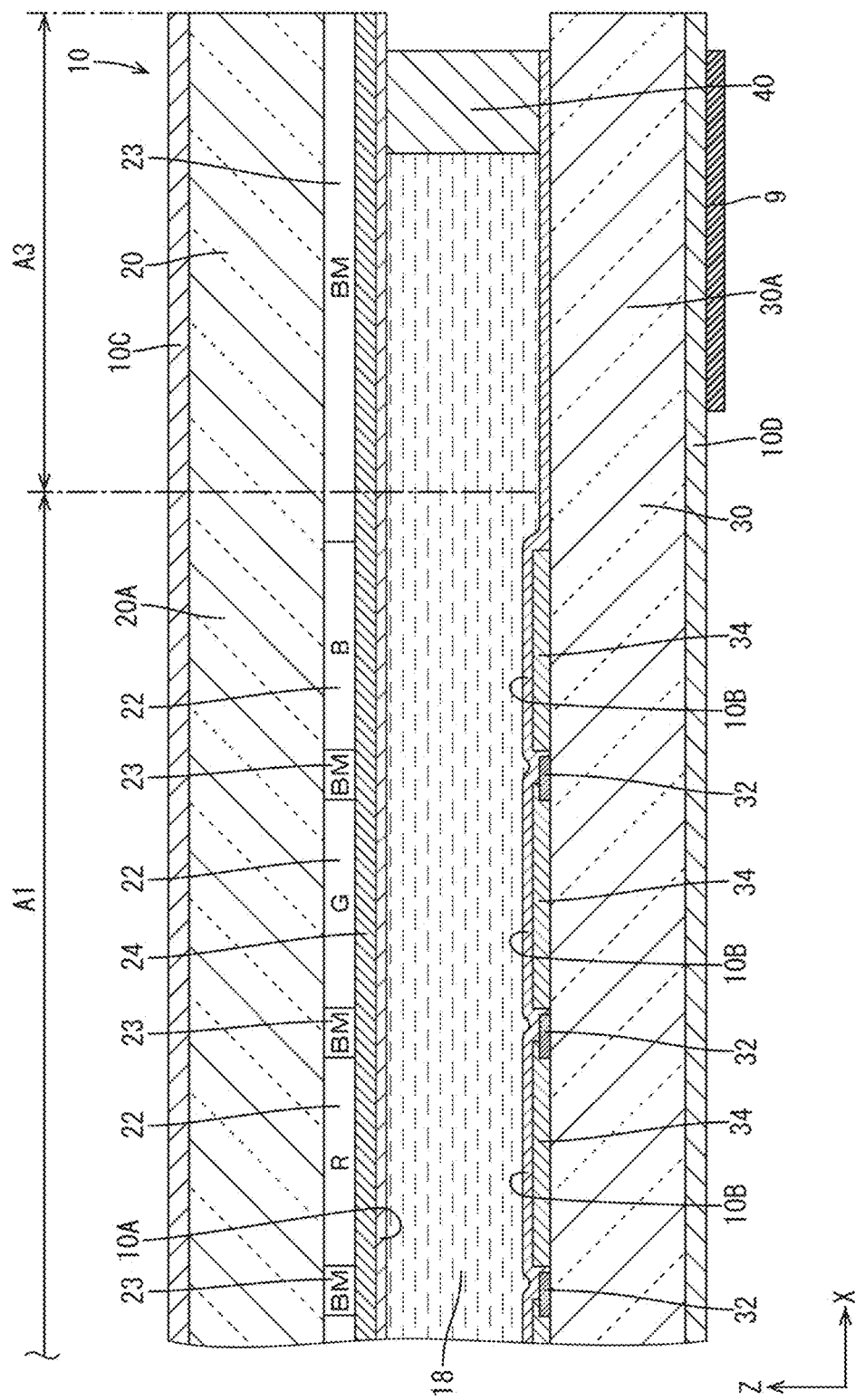
FIG. 4 is a schematic cross-sectional view of the liquid crystal panel illustrating a cross-sectional configuration thereof along a IV-IV plane in FIG. 3.

As illustrated in FIGS. 2 and 4, the liquid crystal panel 10 includes a pair of glass boards 20 and 30 having high light transmissivity and a liquid crystal layer 18 containing liquid crystal molecules. The liquid crystal molecules are substances having optical characteristics that vary according to application of electrical field. The boards 20 and 30 of the liquid crystal panel 10 are bonded with a sealant 40 while a cell gap corresponding to a thickness of the liquid crystal layer 18 maintained therebetween. One of the boards 20 and 30 on the front side is the color filter board 20 and the other on the rear side (back side) is the array board 30. Alignment films 10A and 10B are formed on inner surfaces of the boards 20 and 30 for orientating the liquid crystal molecules in the liquid crystal layer 18. The color filter board 20 includes a first glass substrate 20A and the array board 30 includes a second glass substrate 30A. Polarizing plates 10C and 10D are bonded to outer surfaces of the first glass substrate 20A and the second glass substrate 30A, respectively.

The color filter board 20 and the polarizing plate 10D are bonded to a major section of the second glass substrate 30A of the array board 30. A section including a mounting area in which the IC chip 12 and the flexible circuit board 14 are mounted does not overlap the color filter board 20 and the polarizing plate 10D. The sealant 40 for bonding the boards 20 and 30 of the liquid crystal panel 10 is disposed in a section of the frame area A3 in which the boards 20 and 30 overlap to surround the display area A1 and partially overlap the light blocking area A4.

The array board 30 and a polarizing plate 10C are bonded to a major section of the first glass substrate 20A of the color filter board 20. As illustrated in FIG. 3, the color filter board 20 has a dimension in the X-axis direction about equal to that of the array board 30 and a dimension in the Y-axis direction smaller than that of the array board 30. The color filter board 20 is bonded to the array board 30 with one of edges in the Y-axis direction (the upper edge in FIG. 3, having a curved outline) aligned with an edge of the array board 30 on the same side. Therefore, the other edge of the array board 30 in the Y-axis direction (the lower edge in FIG. 3) does not overlap the color filter board 20 for an entire specified area, that is, front and back plate surfaces are exposed to the outside. The edge includes the mounting area in which the IC chip 12 and the flexible circuit board 14 are mounted.

Next, the configuration of the array board 30 in the display area A1 will be described. The liquid crystal panel 10 according to this embodiment is a normally white type panel that operates in twisted nematic (TN) mode. As illustrated in FIG. 4, the array board 30 of the pair of boards 20 and 30 includes pixel electrodes 34 and the color filter board 20 includes common electrodes 24 opposed to the pixel electrodes 34 via the liquid crystal layer 18. The pixel electrodes 34 and the common electrodes 24 are transparent electrode films made of indium tin oxide (ITO). Voltages applied to the pixel electrodes 34 and the common electrodes 24 are controlled by the control circuit board 16. The pixel electrodes 34 and the common electrodes 24 are examples of a voltage applied section.

Figure 5:
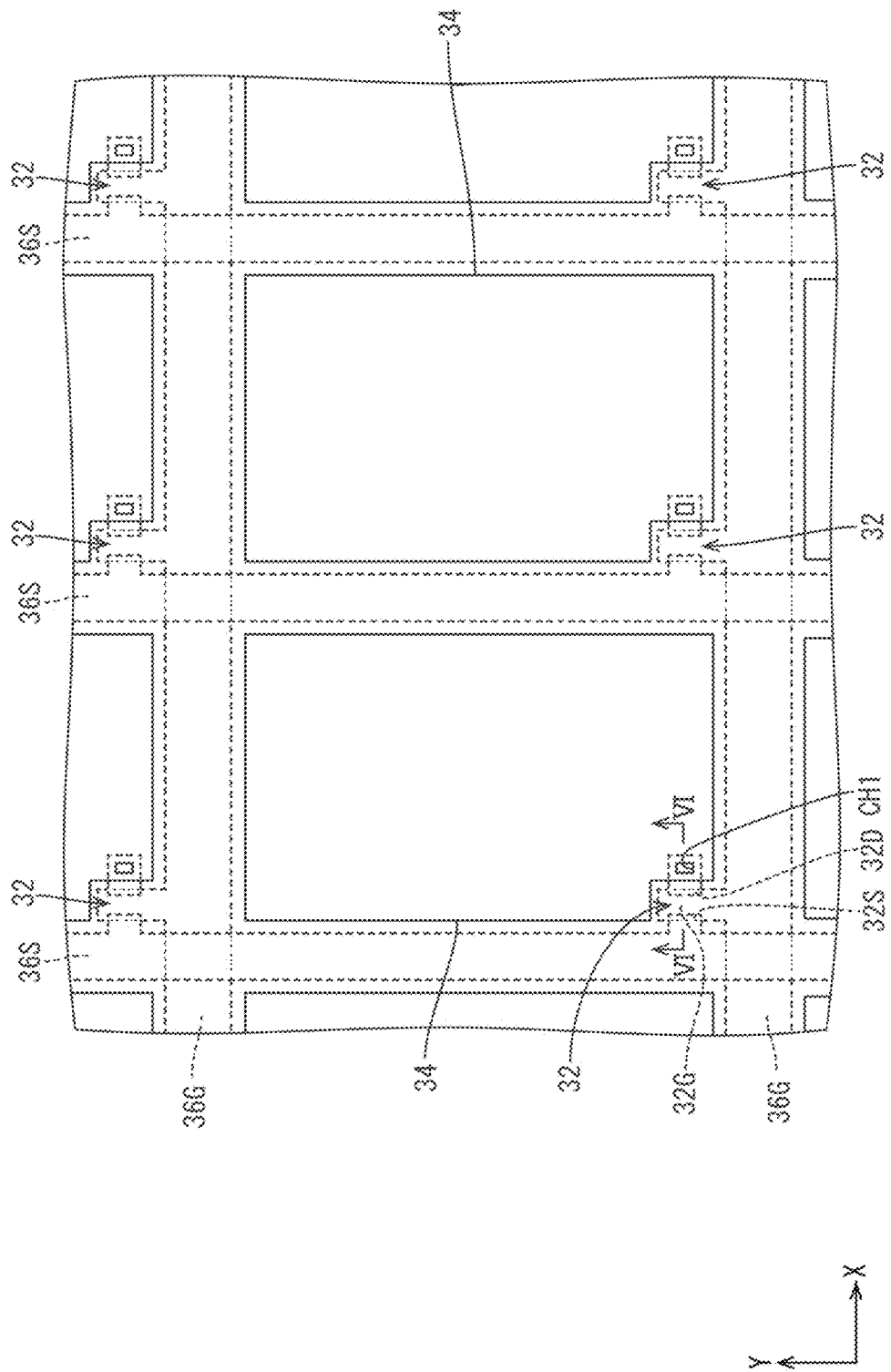
FIG. 5 is a plan view of an array board included in the liquid crystal panel illustrating a planar configuration thereof at a boundary between a display area and a frame area and therearound.

In the display area A1 of the liquid crystal panel 10, a thin film pattern 30L is formed on the inner surface of the second glass substrate 30A of the array board 30 (on the liquid crystal layer 18 side). The thin film pattern 30L is formed from multiple thin film patterns formed on top of one another. Specifically, the thin film pattern 30L includes a thin film pattern of TFTs 32 that are switching components and a thin film pattern of the pixel electrodes 34. As illustrated in FIG. 5, the TFTs 32 include gate electrodes 32G, source electrodes 32S, and drain electrodes 32D. As illustrated in FIG. 5, a number of the TFTs 32 and a number of the pixel electrodes 34 that are connected to the drain electrodes 32D of the TFTs 32 are arranged in a matrix on the inner surface of the second glass substrate 30A.

As illustrated in FIG. 5, gate lines 36G and source lines 36S are routed in a grid to surround the TFTs 32 and the pixel electrodes 34. The gate lines 36G extend in the X-axis direction. The source lines 36S extend in the Y-axis direction perpendicular to the gate lines 36G. The gate lines 36G include branch lines that extend from sections thereof adjacent to sections that cross the source lines 36S in a direction parallel to the source lines 36S. The source lines 36S include branch lines extend from sections thereof adjacent to sections that cross the gate lines 36G in a direction parallel to the gate lines 36G. Distal end sections of the branch lines of the gate lines 36G overlap distal end sections of the branch lines of the source lines 36S in the plan view and the TFTs 32 are disposed at the overlapping sections.

The sections of the gate lines 36G overlapping the TFTs 32 in the plan view are the gate electrodes 32G of the TFTs 32. The sections of the source lines 36S overlapping the gate electrodes 32G are the source electrodes 32S of the TFTs 32. The TFTs 32 include the drain electrodes 32D opposed to the source electrodes 32S with predefined gaps in the X-axis direction to form an island pattern. As illustrated in FIG. 3, each pixel electrode 34 is disposed in about an entire area of a corresponding section defined by the gate liens 36G and the source lines 36S. Each electrode 34 has a vertically-long rectangular shape in the plan view.

The array board 30 includes capacitive lines (not illustrated) parallel to the gate lines 36G and overlapping the pixel electrodes 34 in the plan view. The capacitive lines and the gate lines 36G are arranged alternatively in the Y-axis direction. The gate lines 36G are arranged between the pixel electrodes 34 that are adjacent to each other in the Y-axis direction. The capacitive lines are arranged to cross about the middle of the pixel electrodes 34 in the Y-axis direction. Terminals extending from the gate lines 36G and the capacitive lines and terminals extending from the source lines 36S are disposed at the edge of the array board 30. Signals from the control circuit board 16 illustrated in FIG. 1 or a reference voltage is applied to the terminals to control the driving of the TFTs 32.

Figure 6:
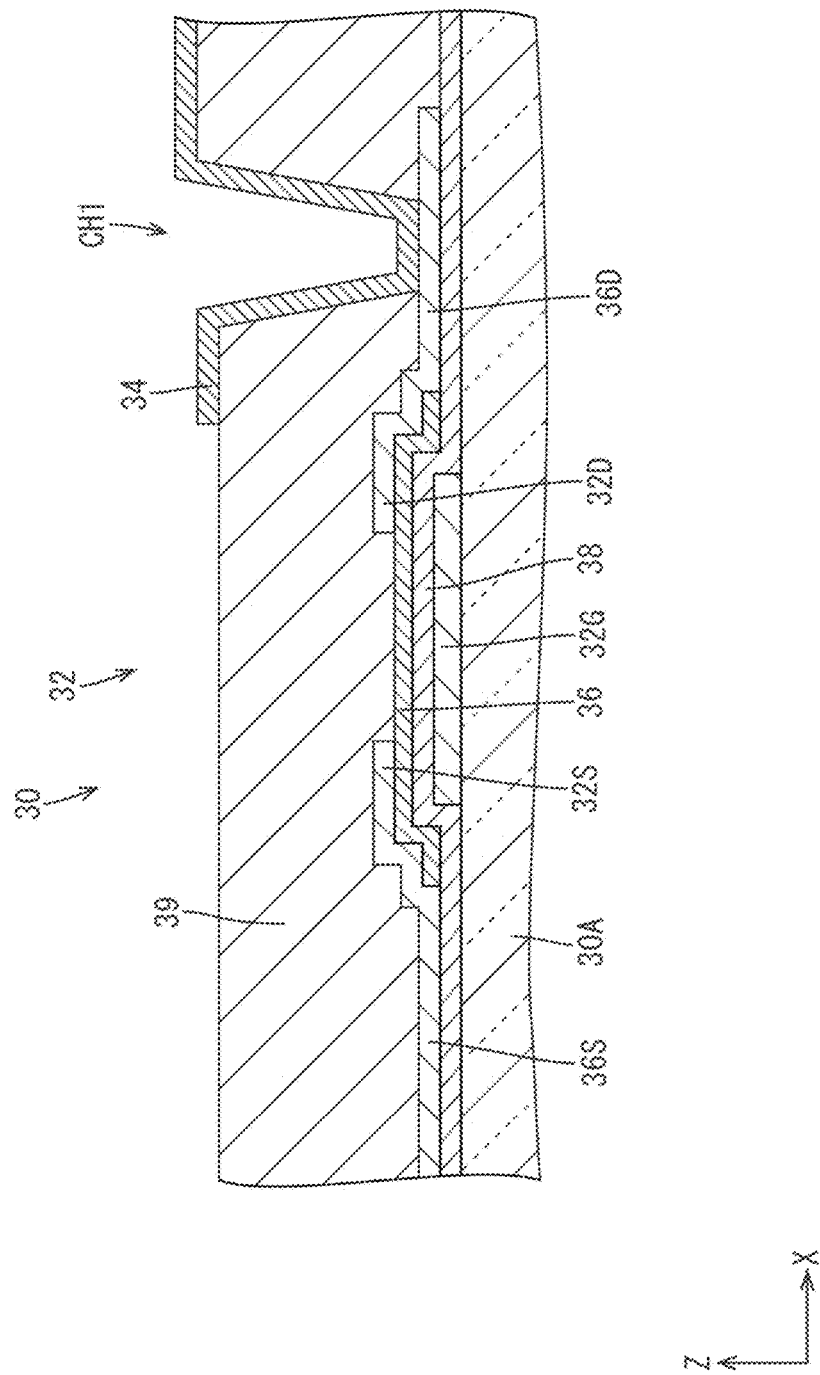
FIG. 6 is a cross-sectional view of a TFT illustrating a cross-sectional configuration thereof along a VI-VI plane in FIG. 5.

As illustrated in FIG. 6, each TFT 32 includes the gate electrode 32G, a gate insulating film 38 that covers the gate electrode 32G, the source electrode 32S, the drain electrode 32D, and an interlayer insulating film 39 formed in layers in this sequence from the lower layer side (the second glass substrate 30A side). The pixel electrodes 34 are formed on the interlayer insulating film 39. The semiconductor film 38 is formed across a gap between the source electrode 32S and the drain electrode 32D. In the TFT 32, the source electrode 32S and the drain electrode 32D are opposed to each other with the predefined gap therebetween and not electrically connected to each other directly. However, the source electrode 32S and the drain electrode 32D are electrically connected via the semiconductor film 38 in the lower layer. A bridge section of the semiconductor film 38 between the electrodes 32S and 32D functions as a channel region through which a drain current flows.

The interlayer insulating film 39 includes contact holes CH1 at positions overlapping the drain electrodes 32D in the plan view adjacent to the TFTs 32. The contact holes CH1 are through holes that run in the top-bottom direction. Sections of the drain electrodes 32D in the three holes CH1 are exposed. The pixel electrodes 34 are formed to cross the contact holes CH1. The pixel electrodes 34 are connected to the drain electrodes 32D. When the voltage is applied to the gate electrode 32G of each TFT 32 (the TFT 32 is turned on), the current flows between the source electrode 32S and the drain electrode 32D via the channel region and a predefined voltage is applied to the corresponding pixel electrode 34 because the pixel electrode 34 is connected to the drain electrode 32D. The reference voltage is applied to each common electrode 24 via the common electrode line. By controlling the voltage applied to the pixel electrode 34 per TFT 32, a predefined voltage difference is produced between the pixel electrode 34 and the common electrode 24.

The semiconductor film 38 that forms the TFTs 32 is made of an oxide semiconductor. The oxide semiconductor of the semiconductor film 38 may be an oxide indium gallium zinc (In—Ga—Zn—O) based semiconductor containing indium (In), gallium (Ga), zinc (Zn), and oxygen (O). The In—Ga—Zn—O based semiconductor is a ternary oxide containing indium (In), gallium (Ga), and zinc (Zn) with a ratio of In, Ga, and Zn (a composition ratio) which is not limited. For example, In:Ga:Zn may be 2:2:1, 1:1:1, or 1:1:2. Such an oxide semiconductor (the In—Ga—Zn—O base semiconductor) may have an amorphous structure. More preferably, the oxide semiconductor has crystalline structure including crystalline components. A crystalline In—Ga—Zn—O based semiconductor with the c axis substantially perpendicular to a layer surface is preferable for the oxide semiconductor having the crystalline structure. An example of the crystalline structure of such an oxide semiconductor (the In—Ga—Zn—O based semiconductor) is disclosed in Unexamined Japanese Application Publication No. 2012-134475. The disclosure of Unexamined Japanese Application Publication No. 2012-134475 is incorporated herein by reference its entirety.

The oxide semiconductor film 38 has electron mobility 20 to 50 times higher in comparison to an amorphous silicon thin film. Therefore, the TFT 32 can be easily reduced in size to obtain an optimal amount of light transmitting through the pixel electrode 34. This configuration is preferable for increasing the definition of the liquid crystal panel 10 and reducing the power consumption of the backlight unit 2 that supplied light to the liquid crystal panel 10. Furthermore, the channel region of the TFT 32 is made of the oxide semiconductor. In comparison to a configuration in which the amorphous silicon is used for the channel region, the TFT 32 has higher off characteristics and thus an off leaking current may be about one hundredth which is significantly small. Therefore, the pixel electrode 34 has a higher voltage holding rate. This configuration is preferable for reducing the power consumption of the liquid crystal panel 10. The TFT 32 includes the gate electrode 32G in the lowest layer and the channel region in the upper layer than the gate electrode 32G via the first insulating film 39A. Namely, the TFT 32 is an inversely staggered type transistor having a layered structure similar to that of a TFT including a regular amorphous silicon film.

Next, the configuration of the color filter board 20 in the display area A1 will be described. In the display area A1, as illustrated in FIG. 4, color filters 22 are disposed at positions overlapping the pixel electrodes 34 of the array board 30 in the plan view, that is, in a matrix on the inner surface of the first glass substrate 20A of the color filter board 20 (on the liquid crystal layer 18 side). The color filters 22 include red (R), green (G), and blue (B) color sections. A light blocking section in a grid form (a black matrix) is formed among the color filters 22 to restrict color mixture. The light blocking section 23 overlaps the gate lines 36G, the source lines 36S, and the capacitive lines of the array board 30 in the plan view. The light blocking section 23 is made of black photosensitive resin (resist film) having light blocking properties. Each color section included in each color filter 22 is made of photosensitive resin (resist film) colored in a corresponding color.

Figure 7:
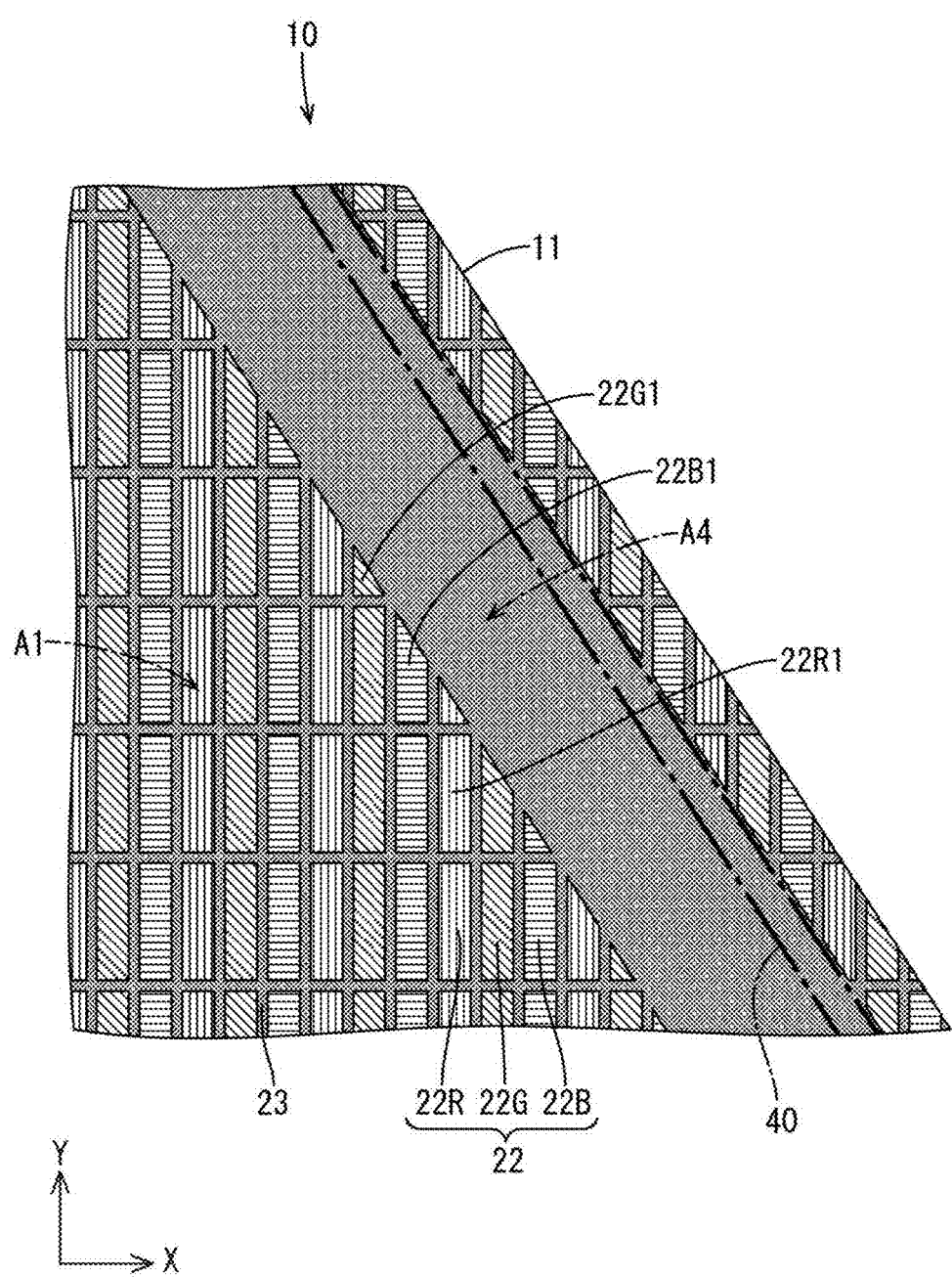
FIG. 7 is a plan view illustrating a boundary between a section of a frame area at a panel sloped side and the display area when the liquid crystal panel is turned off.

The common electrodes 24 are disposed on the inner surfaces of the color filters 22 and the light blocking section (on the liquid crystal layer 18 side) opposite the pixel electrodes 34 of the array board 30. In FIG. 7 and the drawings after FIG. 7, the red color sections of the color filters 22 are shaded with vertical lines and the indicated with symbol 22R. The green color sections are shaded with diagonal lines and indicated with symbol 22G. The blue color sections are shaded with horizontal lines and indicated with symbol 22B. As illustrated in FIG. 7, sets of the red color sections 22R, the green color sections 22G, and the blue color sections 22B are repeatedly arranged in the row direction (the X-axis direction). Each of lines of the color sections 22R, 22G, and 22B in the column direction (the Y-axis direction) includes the same color.

In the liquid crystal panel 10, a set of the R color section 22R, the green color section 22G, the blue color section 22B, and three pixel electrodes opposed to the respective color sections 22R, 22G, and 22B forms one display pixel. Namely, the display pixel includes a red color pixel including the R color section 22R, a green color pixel including the G color pixel 22G, and a blue color pixel including the B color pixel 22B. The color sections 22R, 22G, and 22B are repeatedly arranged in the row direction (the X-axis direction) on the plate surface of the liquid crystal panel 10 to form lines of pixels. The lines of pixels are arranged in the column direction (the Y-axis direction) (see FIG. 6). If the light to one of the color sections 22R, 22G, and 22B of each display pixel is blocked and thus the display pixel is out of a proper chromaticity range, such color sections 22R, 22G, and 22B are defined as color sections that do not form the display pixel.

As illustrated in FIG. 7, the light to the color sections 22R, 22G, and 22B in the color filter board 20 around the panel sloped sides 11 of the panel surface of the liquid crystal panel 10 overlapping the light blocking areas A4 in the plan view is blocked and thus the color sections 22R, 22G, and 22B are out of the proper chromaticity range. The color sections that are out of the proper chromaticity range (ones that at least partially overlap the light blocking areas A4) are defined as the color sections that do not form the display pixels (e.g., the blue color section indicated with symbol 22B1 and the green color section indicated with symbol 22G1 in FIG. 7). Other color sections included in the display pixels that include the color sections defined as the color sections that do not form the display pixels are also defined as the color sections that do not form the display pixels even though the chromaticity thereof are proper (e.g., the red color section indicated with symbol 22R1 in FIG. 7). Most of the sections of the color filter board 20 overlapping the light blocking areas A4 except for the sections closer to the display area A1 are alignment failure areas in which the orientation control on the liquid crystal layer 18 is difficult (the area indicated with symbol A5 in FIG. 2).

Figure 8:
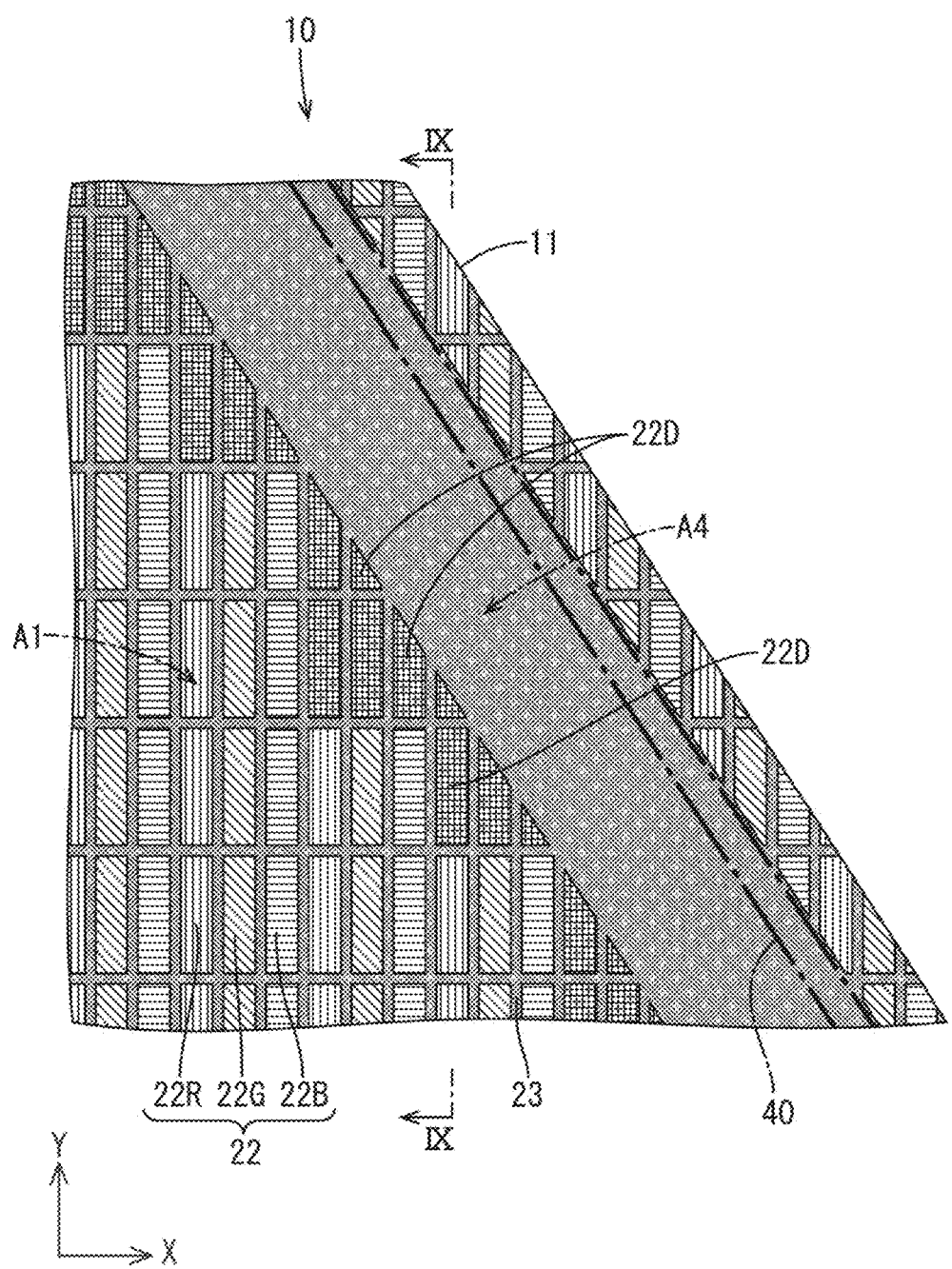

The liquid crystal panel 10 has the configuration described above. Next, a method of driving the liquid crystal panel 10 having the above configuration will be described. In this embodiment, the liquid crystal panel 10 is driven such that the color sections 22R1 22G1, and 22B1 that do not form the display pixels among the color sections 22R, 22G, and 22B located adjacent to the panel sloped sides 11 on the panel surface of the liquid crystal panel 10, that is, the color sections 22R, 22G, and 22B located adjacent to the light blocking areas A4 in the plan view of the liquid crystal panel 10 are constantly in a black state. In FIG. 8, the color sections in the black state are shaded with a grid pattern and indicated with symbol 22D. The color sections 22R, 22G, and 22B located adjacent to the light blocking areas A4 may include not only the color sections adjacent to the light blocking areas A4 but also the color sections that at least partially overlap the light blocking areas A4 in the plan view.

As described above, the liquid crystal panel 10 in this embodiment is the normally white type panel. Therefore, when the voltages are not applied to the pixel electrodes 34 and the common electrodes 24, the transmissivity of the liquid crystal layer 18 becomes the maximum and the display pixels enters into the white state in the plan view. The color sections 22R1, 22G1, and 22B1 that do not form the display pixels are constantly in the black state. Specifically, the voltages applied to the pixel electrodes 34 and common electrodes 35 are partially controlled by the control circuit board 16 to maximize the voltages applied to the sections of the liquid crystal layer 18 overlapping the color sections 22R1, 22G1, and 22B1 that do not form the display pixels to minimize the transmissivity thereof. Therefore, the color sections 22R1, 22G1, and 22B1 that do not form the display pixels are constantly in the black state (the color sections indicated with symbol 22D in FIG. 8).

Figure 9:
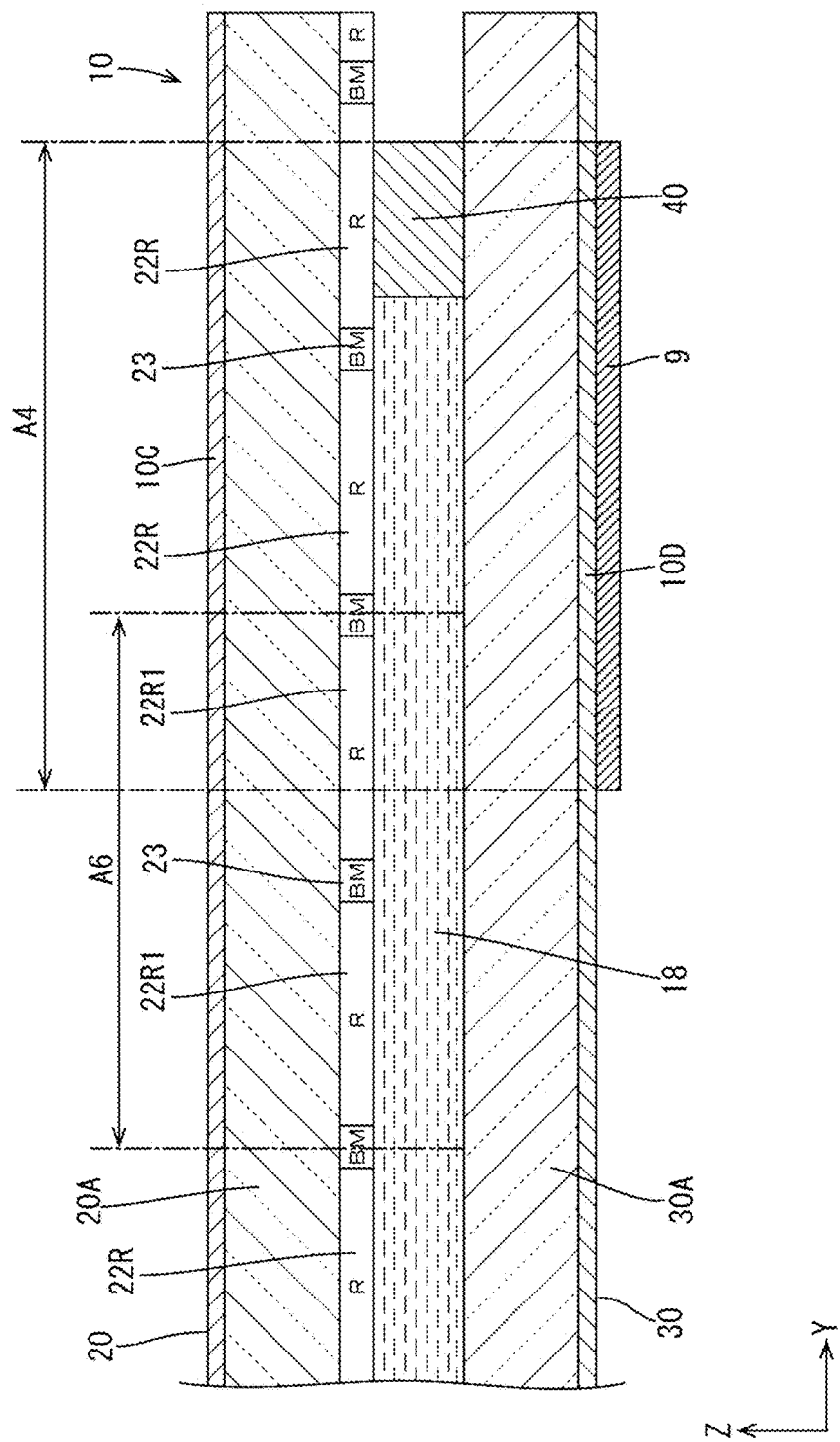
FIG. 9 is a schematic cross-sectional view of the liquid crystal panel along a IX-IX plane in FIG. 8.

Sections of the panel surface of the liquid crystal panel 10 overlapping the color sections 22D in the black state during the driving of the liquid crystal panel 10 in the plan view are referred to as black state areas A6 (see at least FIG. 2). Because the display pixels (or the color sections) are arranged in the matrix, the widths of the black state areas A6 are different from one another according to the cross sections of the liquid crystal panel 10. For example, in the cross section along the IX-IX plate in FIG. 8, as illustrated in FIG. 9, two red color sections are in the black state and an area overlapping the two color sections in the thickness direction of the liquid crystal panel 10 (the Z-axis direction) is defined as the black state area A6. As illustrated in FIG. 9, the black state area A6 overlaps a section of the light blocking area A4 closer to the sealant 40.

Figure 10:
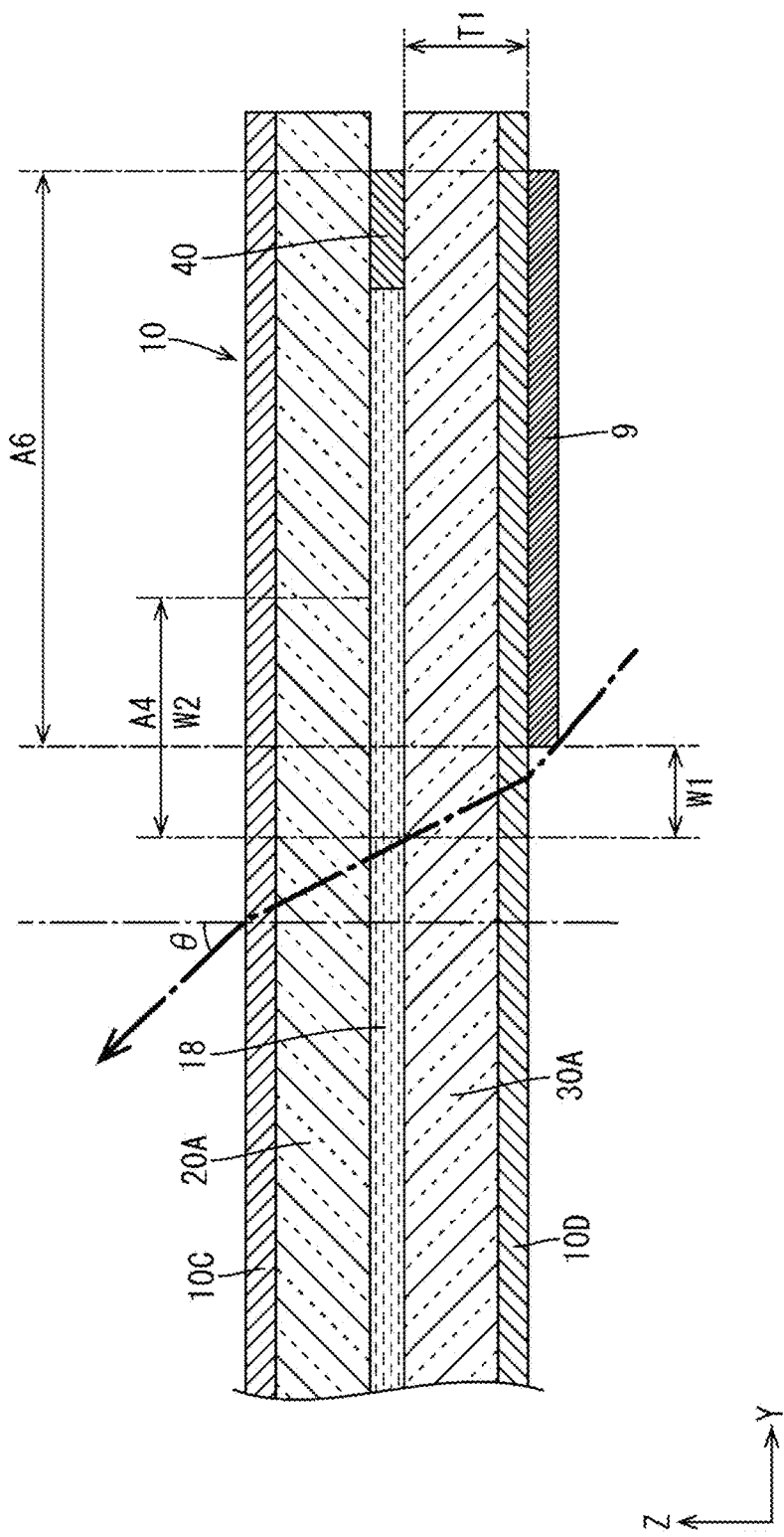
FIG. 10 is a schematic cross-sectional view for illustrating arrangement conditions of a light blocking area and color sections that are in a black state in the liquid crystal pane.

Next, arrangement conditions of the light blocking areas A4 and the black state areas A6 in the liquid crystal panel 10 will be described. As illustrated in FIG. 10, the maximum angle among angles relative to a line normal to the panel surface of the liquid crystal panel 10 at which a displayed image can be viewed is defined as θ. The width of the section of the black state area A6 not overlapping the light blocking area A4 in the thickness direction of the liquid crystal panel 10 (the Z-axis direction) in a cross section of the liquid crystal panel 10 is defined as W1. The width of the black state area A6 is defined as W2. The refractive index and the thickness of the array board 30 are defined as N and T1, respectively. The liquid crystal panel 10 in this embodiment is formed such that the following formulas (1) and (2) are satisfied in any cross section of the liquid crystal panel 10.

$$W1 \geq T1 \cdot \tan(\sin^{-1}(\sin \theta / N)) \quad (1)$$

$$W2 \geq 2 \cdot W1 \quad (2)$$

When the maximum angle θ, the thickness T1, and the refractive index N are 60 degrees, 0.7 mm, and 1.51, respectively, W1≥0.49 mm according to formula (1) and W2≥0.98 mm according to formula (2). In the liquid crystal panel 10 in this embodiment, when these conditions are satisfied, light passing through the liquid crystal panel 10 travel in a path indicated with thick arrow in FIG. 10 because of the light blocking areas A4 and the black state areas A6. Therefore, the light leakage from the panel surface of the liquid crystal panel 10 is less likely to occur and the sections adjacent to the light blocking areas A4 are less likely to be colored. Specific values including the width of the light blocking areas A4 can be set for the arrangement conditions of the light blocking areas A4 and the black state areas A6.

Figure 11:
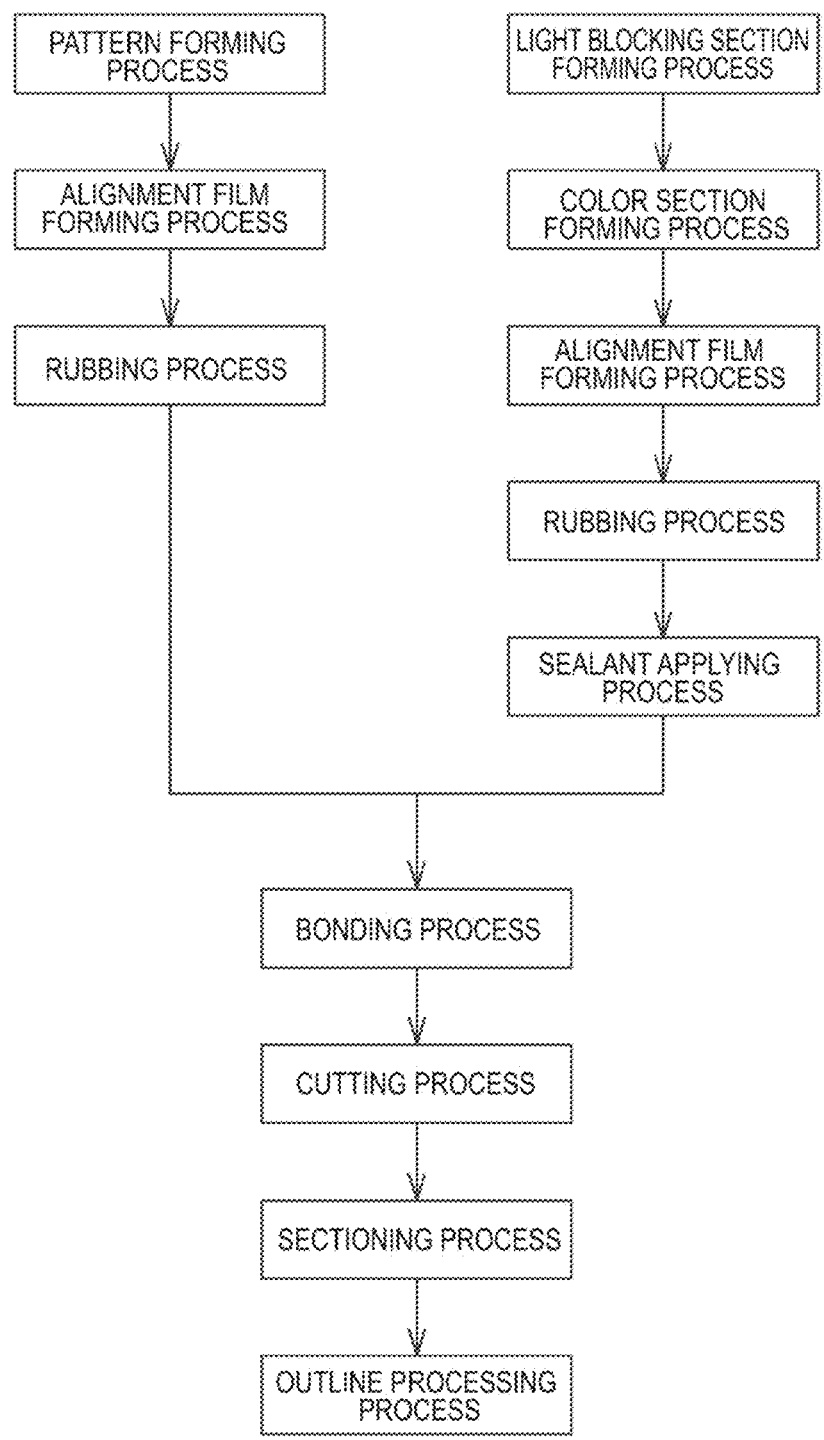
FIG. 11 is a flowchart illustrating a liquid crystal panel production process.

Next, a method of producing the liquid crystal panel 10 in this embodiment will be described. First, a method of producing the color filter board 20 will be described. As illustrated in FIG. 11, the method of producing the color filter board 20 includes a light blocking section forming process, a color section forming process, an alignment film forming process, a rubbing process, and a sealant applying process. The processes are performed in the above sequence. In the method in this embodiment, in the processes described later, a single first glass substrate 20A is divided to produce two liquid crystal panels 10 from the single first glass substrate 20A. Namely, patterns of the light blocking sections 23 and patterns of the color filters 22 of color filter boards 20 are formed in two areas on the first glass substrate 20A (hereinafter referred to as the above-described two areas).

Figure 12:
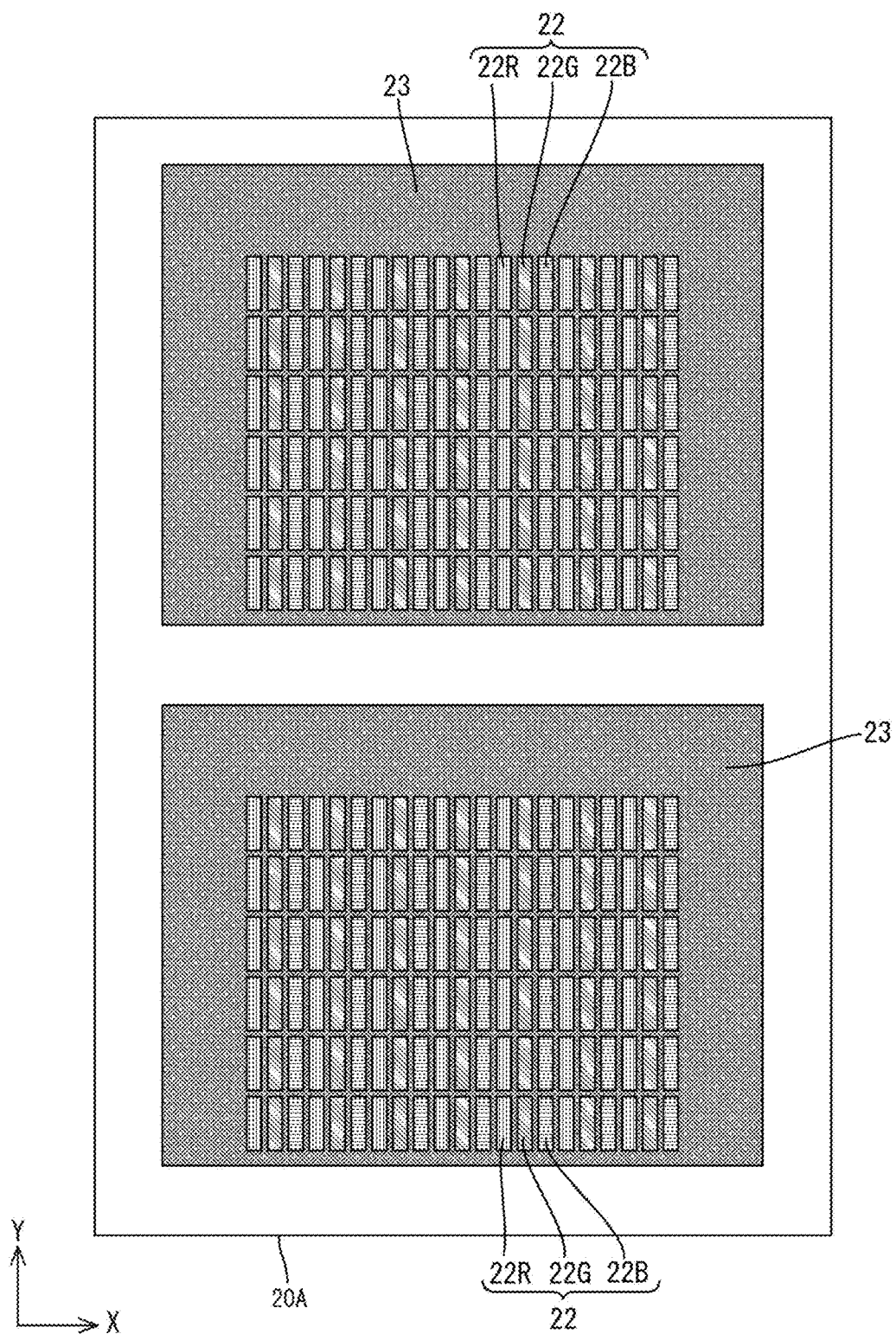
FIG. 12 is a plan view illustrating a liquid crystal panel production process (1).

In the processes of producing the color filter board 20 in this embodiment, a black resist film having light blocking properties is formed on the first glass substrate 20A for an entire area to form the light blocking sections 23. Grid patterns of the light blocking sections 23 are formed in the above-described two areas of the first glass substrate 20A using a known photolithography method (the light blocking section forming process). As illustrated in FIG. 12, the color sections 22R, 22G, and 22B formed from the colored resist film and forming the color filters 22 are formed in the respective areas defined by the grid patterns of the light blocking sections 23 in the above-described two areas using the known photolithography method (the color section forming process). In the color section forming process, the color sections 22R, 22G, and 22B in three different colors are formed in the respective areas defined by the patterns of the light blocking sections 23 according to the arrangement of the color sections 22R, 22G, and 22B in the color filter board 20 to be produced.

Planar patterns (solid patterns) of the common electrodes 24 are formed in the above-described two areas on the first glass substrate 20A to cover the patterns of the light blocking sections 23 and the color sections 22R, 22G, and 22B. A transparent insulating film (not illustrated), which is a protective film, is formed to cover the common electrodes 24 and the alignment film 10A is formed on the surface of the insulating film (the alignment film forming process). A process for rubbing the inner surface of the alignment film 10A (a surface to be opposed to the liquid crystal layer 18 of the produced liquid crystal panel 10) in one direction with a cloth for about an entire area, which is referred to as rubbing processing (the rubbing process). Through the rubbing processing, the liquid crystal molecules in the liquid crystal layer 18 of the produced liquid crystal panel 10 facing the alignment film 10A can be maintained in a constant orientation. The sealant is applied to areas to be edge areas of the liquid crystal panels 10 in the above-described two areas on the first glass substrate 20A (on the alignment film) in frame forms along the outlines of the liquid crystal panels 10 to be produced (the sealant applying process). According to the procedures described above, two color filter boards 20 are prepared on the single first glass substrate 20A.

Figure 13:
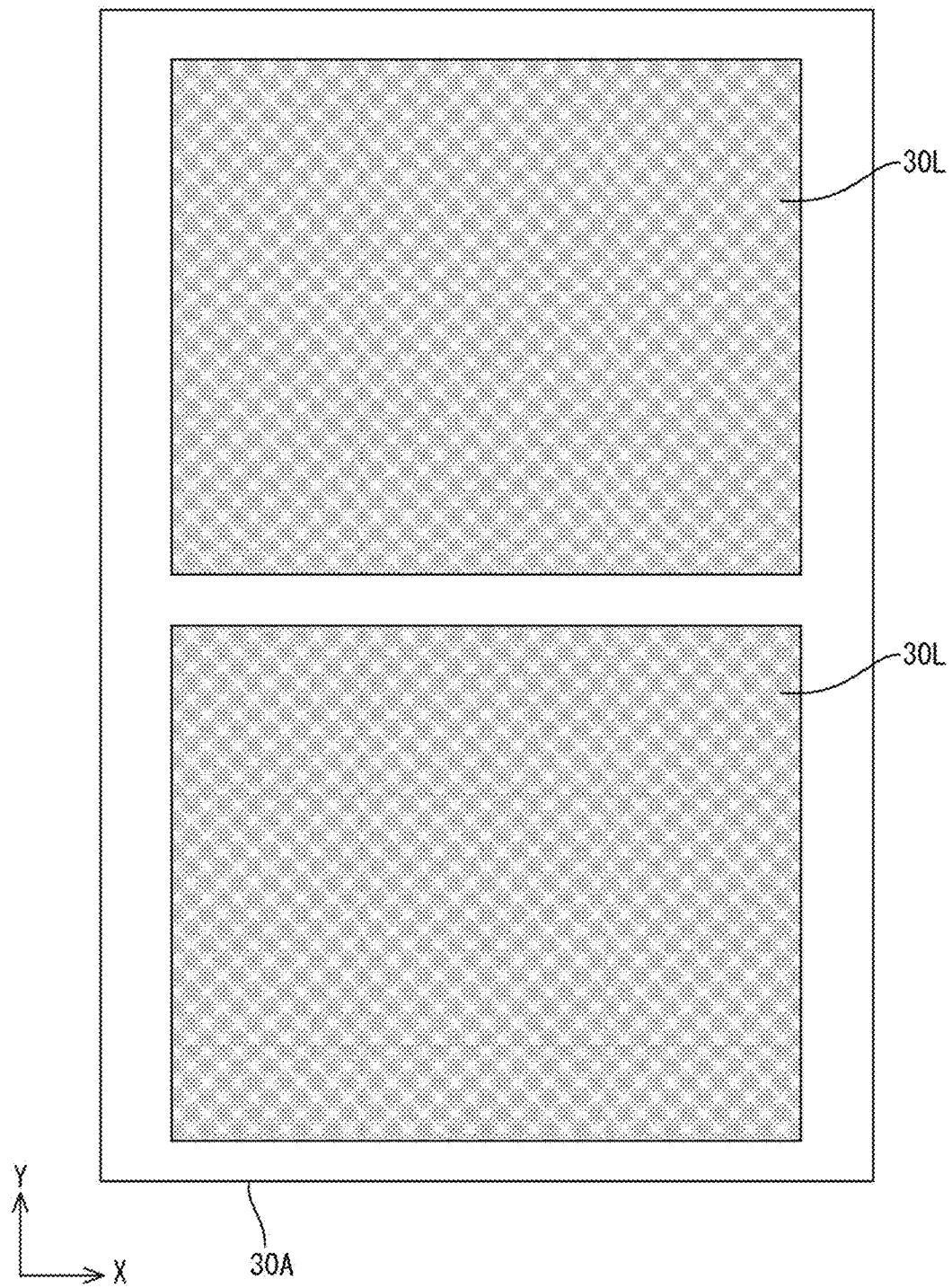
FIG. 13 is a plan view illustrating the liquid crystal panel production process (2).

A method of producing the array board 30 will be briefly described. As illustrated in FIG. 11, the method of producing the array board 30 includes a pattern forming process, an alignment film forming process, and a rubbing process. The processes are performed in the above sequence. Similar to the color filter board 20, two array boards 30 are formed on a single second glass substrate 30A in the processes described later. In the processes of producing the array board 30, as illustrated in FIG. 13, thin film patterns are repeatedly formed in the above-described two areas on the second glass substrate 30A using the known photolithography method to form thin film patterns 30L including multiple layers of the thin film patterns in the above-described two areas (the pattern forming process). In FIG. 13, the thin film pattern set 30L is depicted as a single later film for simplicity.

Similar to the processes of producing the color filter board 20, a transparent insulating film (not illustrated), which is a protective film, is formed to cover the thin film patterns 30L and an alignment film 10A is formed on the surface of the insulating film (the alignment film forming process). The rubbing processing is performed on the alignment film 10A (the rubbing process). According to the procedures described above, two array boards 30 are prepared on the single first glass substrate 20A. In the processes of producing the liquid crystal panel 10, as illustrated in FIG. 11, a bonding process, a cutting process, a sectioning process, and an outline processing process are performed in this sequence after the color filter board 20 and the array board 30 are produced.

In the bonding process, the second glass substrate 30A to be included in the array boards 30 are held opposite the first glass substrate 20A to be included in the color filter board 20 to which the sealant 40 has been applied and positioned such that the end surface of the first glass substrate 20A and the end surface of the second glass substrate 30A are aligned. The liquid crystals are dropped to the areas of the first glass substrate 30A surrounded by the sealant 40 through an one drop fill (ODF) method using a liquid crystal dropping device to form the liquid crystal layer 18. The first glass substrate 20A held opposite the second glass substrate 30A is bonded to the second glass substrate 30A with the sealant 40 to prepare a bonded substrate.

Figure 14:
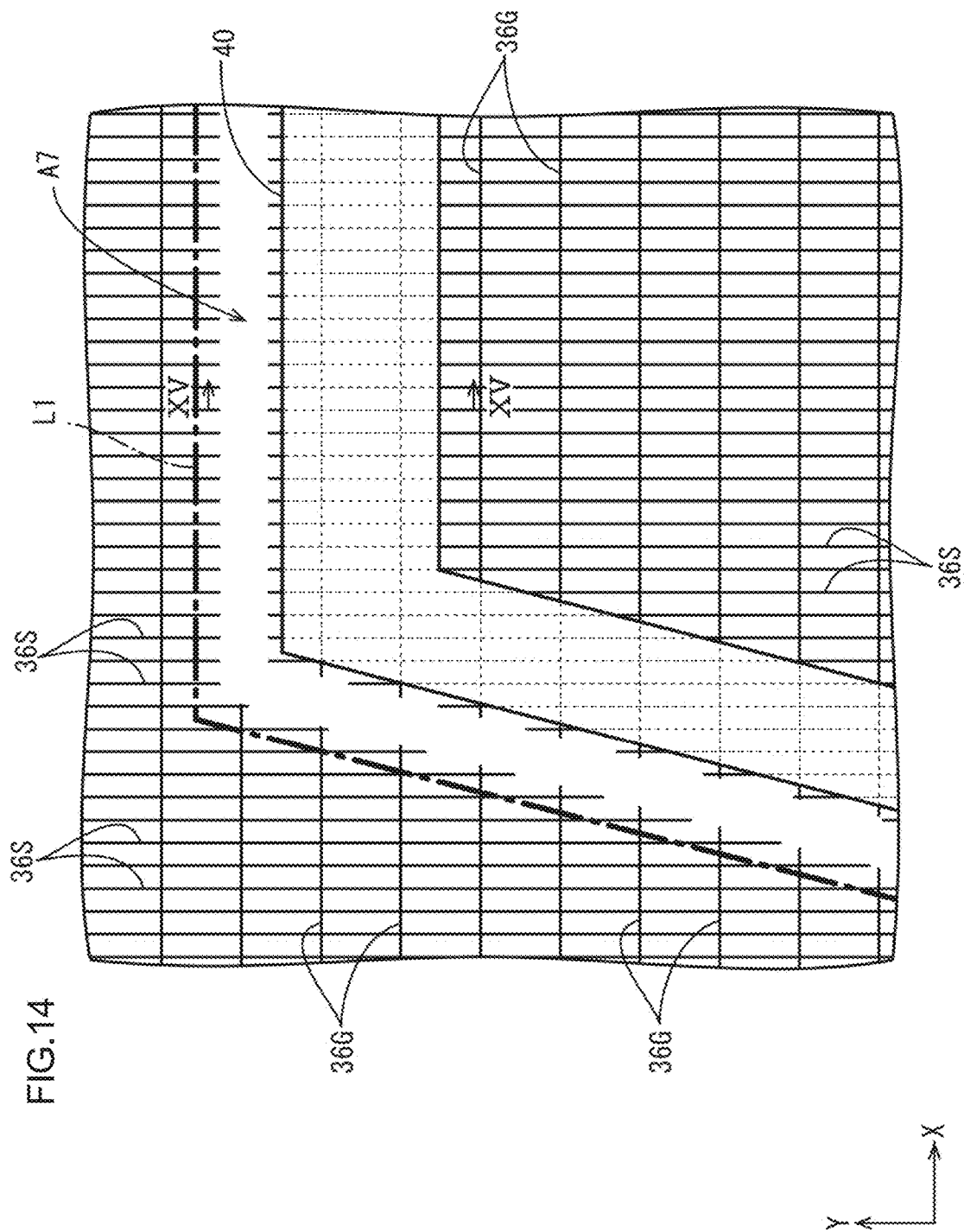
FIG. 14 is a plan view illustrating the liquid crystal panel production process (3).
Figure 15:
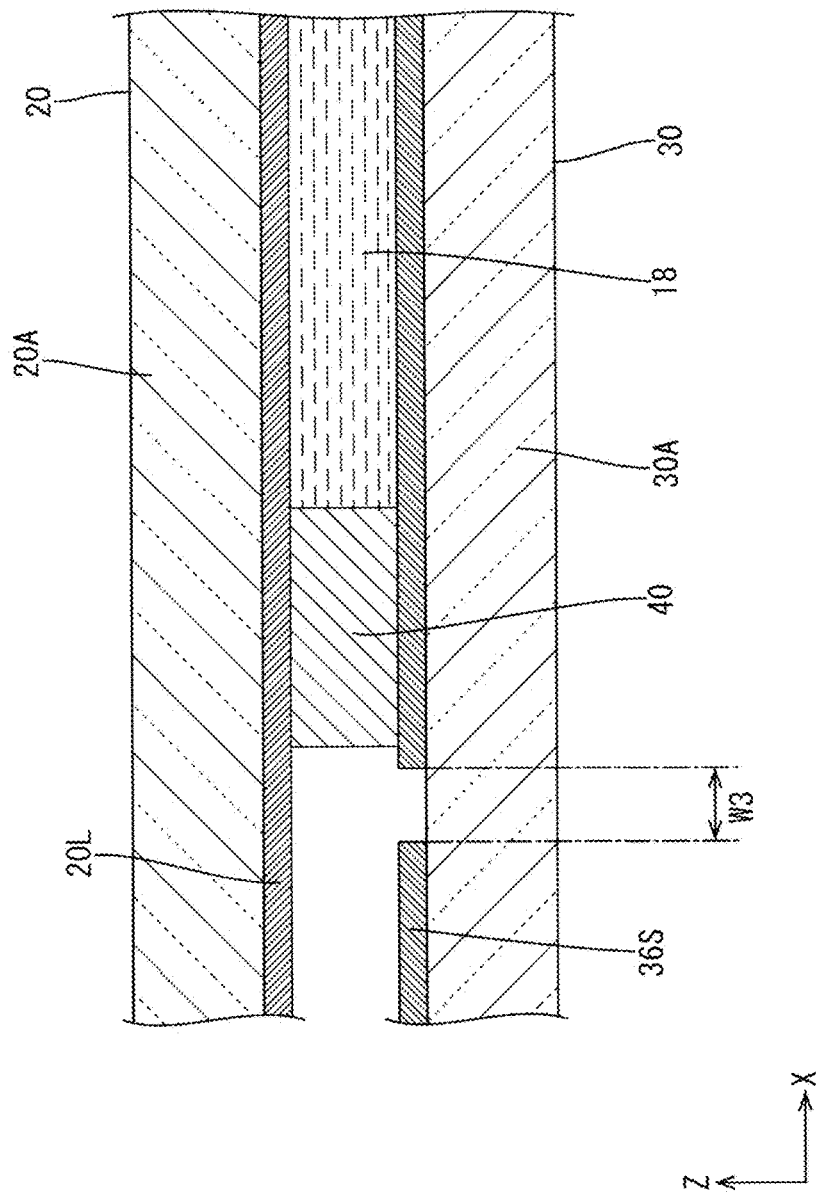
FIG. 15 is a cross-sectional view along a XV-XV plane in FIG. 14.

As illustrated in FIG. 14, a laser beam is applied to the gate lines 36G and the source lines 36S in a section A7 of the bonded substrate between a profile line that forms the outline of the liquid crystal panel 10 to be produced and the sealant 40 and moved along the outline (the cutting process). The gate lines 36G and the source lines 36S are for driving the TFTs 32. In the cutting process, the laser beam is applied from the back side of the second glass substrate 30A (an opposite side from a side to which the first glass substrate 20A is bonded) on which the array boards 30 are formed. Through the cutting process, as illustrated in FIG. 14, the gate lines 36G and the source lines 36S in the section A7 are cut along the outline. A width W3 of a gap between the cut lines 36G and 36S (a scan width of the laser beam, see FIG. 15) is preferably in a range from 0.001 mm to 0.01 mm. In FIG. 15, a CF layer including the color filters 22, the light blocking section 23, and the common electrodes 24 is indicated with symbol 20L and the gate lines 36G are not illustrated.

After the cutting process is completed, the bonded substrate is divided into two by cutting the bonded substrate at the boundary between the above-described two sections using the scriber and the divided bonded substrates are sectioned along the outlines of the liquid crystal panels 10 to be produced (the sectioning process). Through the sectioning process, the outlines of the liquid crystal panels 10 to be produced including the panel sloped sides 11 are prepared. The end surfaces of the sectioned bonded substrates sectioned in the sectioning process, that is, the end surfaces included in the outlines of the liquid crystal panels 10 to be produced are smoothed using a grinder (the outline processing process).

The IC chip 12 and the flexible circuit board 14 are mounted to the section of the second glass substrate 30A outside the sealant 40 and the control circuit board 16 are connected to the flexible circuit board 14. According to the procedures, two liquid crystal panels 10 are prepared. Then, the light blocking tape 9 is bonded to the back surface of each produced liquid crystal panel 10 at a position overlapping the light blocking area A4 in the thickness direction of the liquid crystal panel 10 and the backlight unit 2 is mounted to the back surface of the liquid crystal panel 10 with the light blocking tape 9. The liquid crystal panel 10 and the backlight unit 2 are held with the bezel 3. According to the procedures, the liquid crystal display device 1 according to this embodiment is complete.

As described above, in the liquid crystal display device 1 according to this embodiment, the light blocking area A4 is formed in the section of the frame area A3 of the panel surface of the liquid crystal panel 10. During the driving of the liquid crystal display device 1, the orientation in the liquid crystal layer 18 is controlled by the control circuit board 16 to minimize the transmissivity of the section of the liquid crystal layer 18. Among the color sections 22R, 22G, and 22B located adjacent to the light blocking area A4, the color sections 22R1, 22G1, and 22B1 that overlap the section and do not form the display pixels are constantly in the black state. With the light blocking properties of the light blocking area A4 and the color sections 22R1, 22G1, and 22B1 that are located adjacent to the light blocking area A4 and constantly in the black state, the light leakage from the section of the liquid crystal panel 10 adjacent to the frame area A3 can be effectively restricted.

According to the method of producing the liquid crystal display device 1 according to this embodiment, the light blocking section 23, which is a black matrix, is not formed in the entire area of the frame section of the liquid crystal panel 10 through patterning. However, during the driving of the liquid crystal display device 1, the color sections 22R1, 22G1, and 22B1 among the color section located adjacent to the light blocking area A4 are constantly in the black state. Therefore, the display pixels that overlap the light blocking area A4 and the display pixels therearound are less likely to exhibit display colors that are out of the proper chromaticity range and tinted during the driving of the liquid crystal display device 1. After the liquid crystal panel 10 having the rectangular shape or the square shape is produced using the general photo masks, the liquid crystal panel 10 is cut along the requested outline. Therefore, the number of the photo masks that are required can be maintained low. Even if the liquid crystal panel 10 with the requested outline is produced with the smaller number of the photo masks, the display pixels overlapping the light blocking are A4 and the display pixels therearound are less likely to be colored. Therefore, the liquid crystal display device 1 with the requested outline can be provided while reducing the production cost and restricting the decrease in the display quality.

According to the method of producing the liquid crystal display device 1 according to this embodiment, in the cutting process, the gate lines 36G and the source lines 36S are cut in advance along the outline of the liquid crystal panel 10 to be produced in the section A7 of the array board 30 between the profile line L1 and the sealant 40. In the sectioning process performed after the cutting process, the gate lines 36G and the source lines 36S outside the sealant 40 are less likely to develop a short circuit during the sectioning of the liquid crystal panel 10 along the outline of the liquid crystal panel 10. This restricts the decrease in the display quality of the liquid crystal panel to be produced.

According to the method of producing the liquid crystal display device 1 according to this embodiment, the liquid crystal panel 10 with the requested outline can be produced without an increase in the number of the required photo masks. In comparison to a production method that requires a photo mask for each outline type, the production processes can be reduced.

Second Embodiment

A second embodiment of the present invention will be described with reference to FIGS. 16 to 19. The second embodiment includes a liquid crystal panel 110 included in a liquid crystal display device having configurations, some of which are different from the first embodiment. Furthermore, some processes of a method of producing the liquid crystal display device are different from the first embodiment. Other configurations of the liquid crystal display device and the other processes of the method of producing the liquid crystal display device are similar to those of the first embodiment and thus will not be described.

Figure 16:
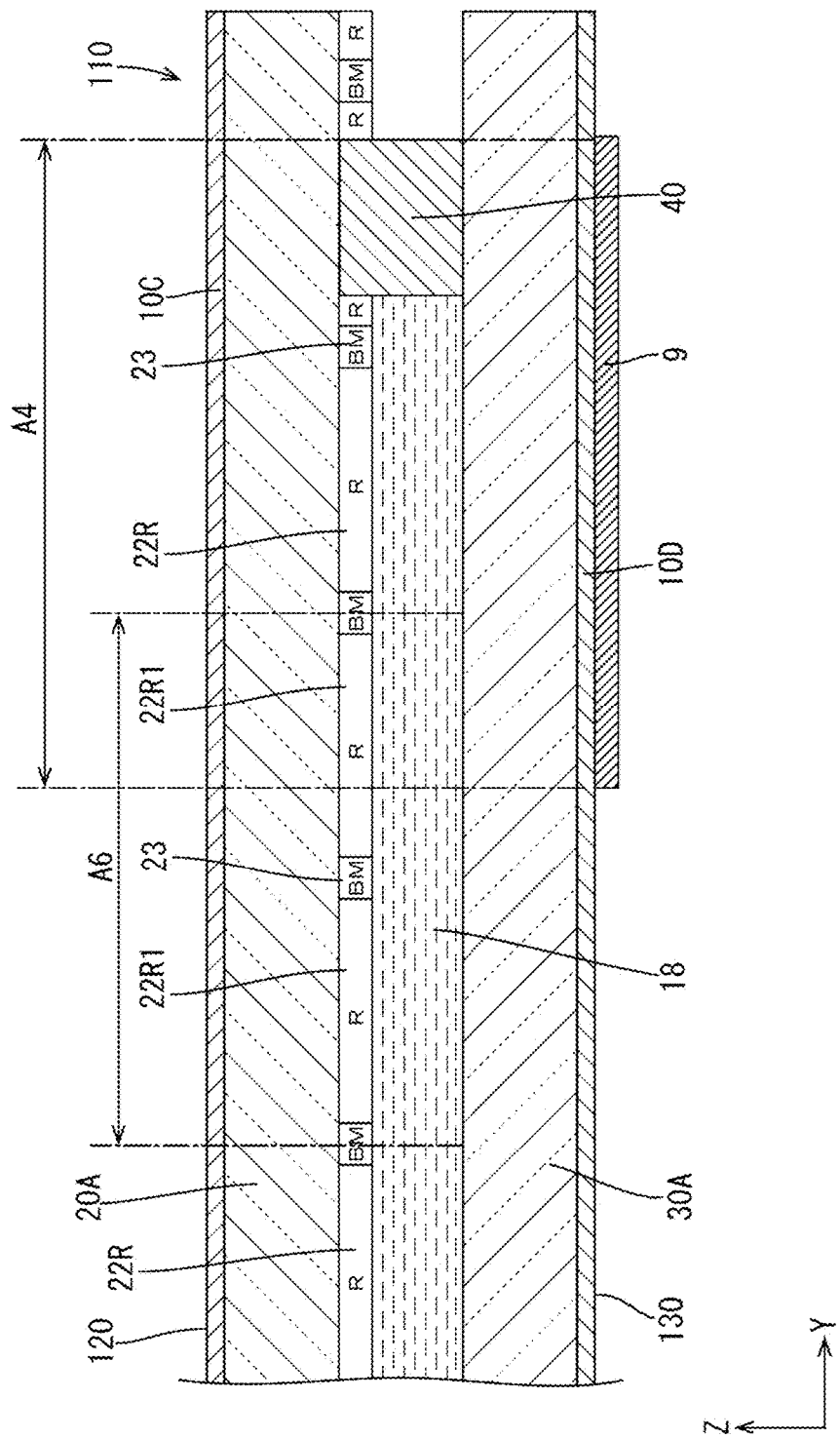
FIG. 16 is a schematic cross-sectional view of a liquid crystal panel according to a second embodiment.

As illustrated in FIG. 16, the liquid crystal panel 110 in the liquid crystal display device according to this embodiment includes a color filter board 120. The color filters 22 and the light blocking section 23 are not formed in an area of the color filter board 120 overlapping the sealant 40 in the thickness direction of the liquid crystal panel 110. As illustrated in FIG. 16, in the liquid crystal panel 110 in this embodiment, the sealant 40 is in close contact with the first glass substrate 20A without color sections 22R, 22G, and 22B therebetween.

In the production processes of the liquid crystal panel 10 in this embodiment, the sealant 40 used for bonding the color filter board 120 and the array board 30 together is made of thermosetting resin or photo-curable resin. The adhesion of the sealant 40 to the first glass substrate 20A is higher than the adhesion of the sealant 40 to the color sections 22R, 22G, and 22B of the color filters 22. In the liquid crystal display device according to this embodiment, the adhesion of the sealant 40 to the first glass substrate 20A is increased in comparison to a configuration in which the color sections are provided between the sealant and the first glass substrate. According to the configuration, a decrease in peeling strength between the color filter board 120 and the array board 30 is less likely to occur.

Figure 17:
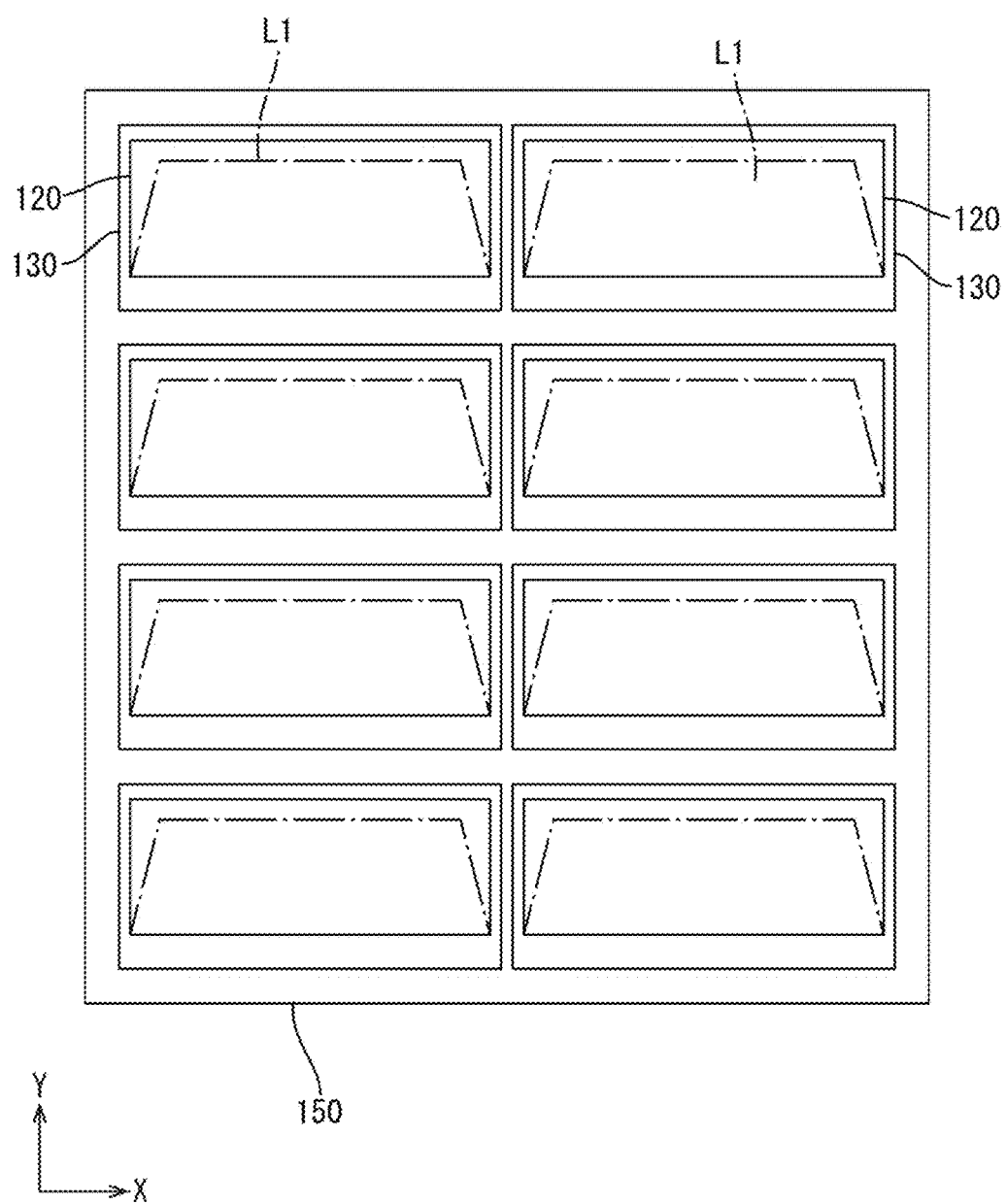
FIG. 17 is a plan view illustrating a liquid crystal panel production process (1).

The processes in the method of producing the liquid crystal display device according to this embodiment different from the first embodiment will be described. According to the method of producing the liquid crystal display device according to this embodiment, in the cutting process of the processes of producing the liquid crystal panel 110, as illustrated in FIG. 17, the bonded substrate is divided to produce eight liquid crystal panels 110 from a single bonded substrate 150. Furthermore, according to the method of producing the liquid crystal display device according to this embodiment, a removing process is preformed between the color section forming process and the alignment film forming process of the processes of producing the color filter board 120 in the liquid crystal panels 110. The removing process will be described below.

In the removing process, the laser beam is applied to sections of the first glass substrate 20A in the color filter board 120 to which the sealant 40 will be applied in the sealant applying process performed after the removing process. The laser beam may have a wavelength of 355 nm and pulse energy of 5 μJ. By applying the laser beam to the sections described above, the color sections 22R, 22G, and 22B in the sections are vaporized and removed. In the sealant applying process performed afterward, the sealant 40 is directly applied to the sections of the first glass substrate 20A described above. Therefore, the color filters 22 and the light blocking sections 23 are not formed in sections of the produced liquid crystal panels 110 overlapping the sealant 40 in the thickness direction of the liquid crystal panels 110.

Figure 18:
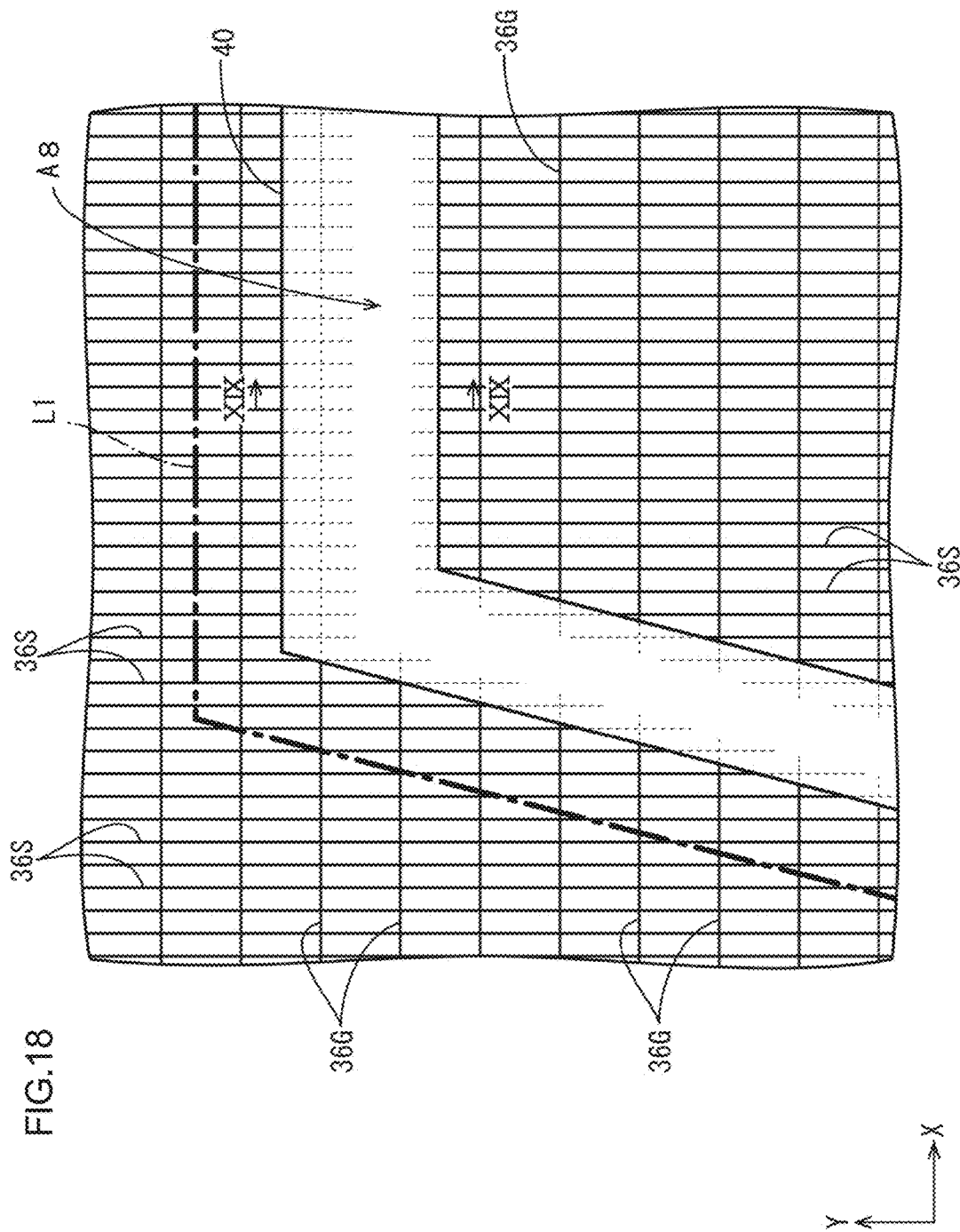
FIG. 18 is a plan view illustrating the liquid crystal panel production process (2).

According to the method of producing the liquid crystal display device according to this embodiment, in the processes of producing the liquid crystal panel 110, a cutting process is performed before the bonding process, specifically, between the pattern forming process and the alignment film forming process of the processes of producing the array boards 130. In the cutting process, as illustrated in FIG. 18, the laser beam is applied to sections A8 of the second glass substrate 130A overlapping areas to which the sealant 40 is applied in the sealant applying process performed after the cutting process and located inside profile lines L1 that form outlines of the liquid crystal panels 110 to be produced and moved along the outlines. As illustrated in FIG. 18, the gate lines 36G and the source lines 36S in the sections A8 are cut along the outlines.

Figure 19:
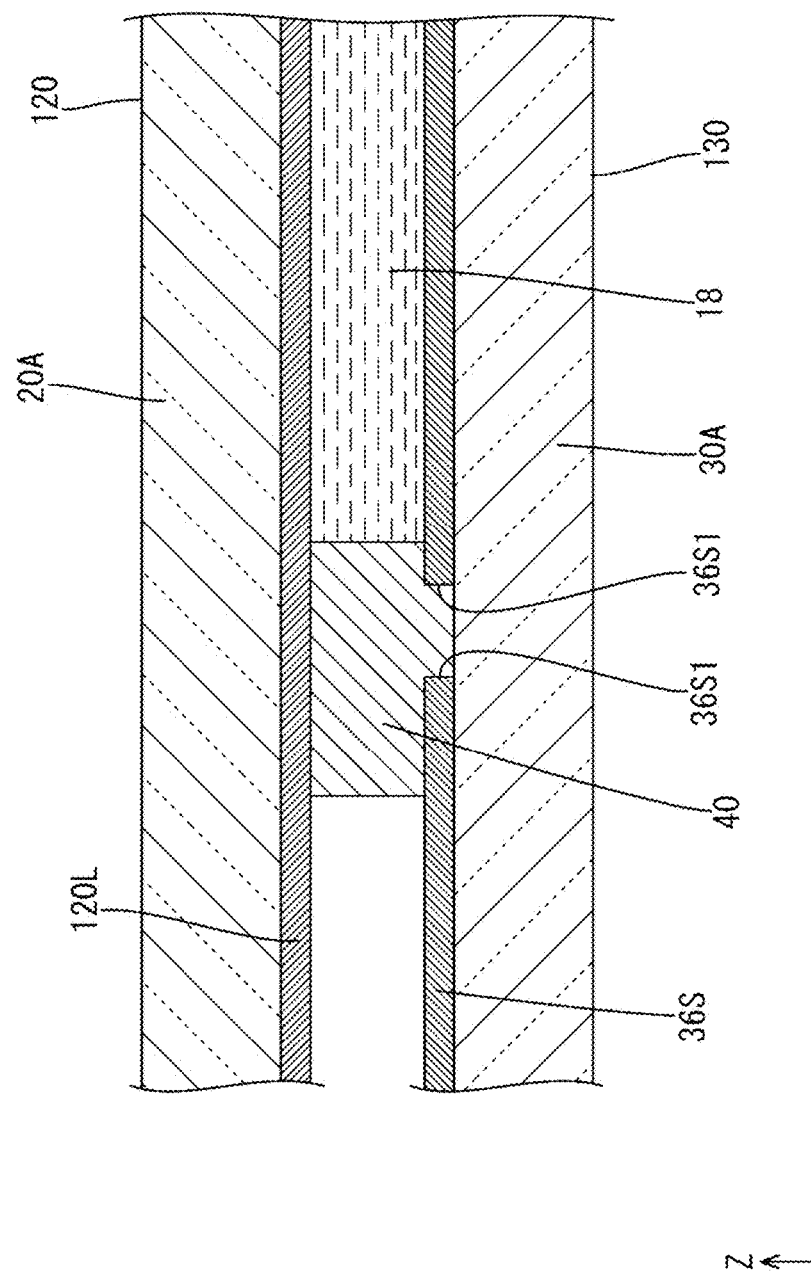
FIG. 19 is a cross-sectional view along a XIX-XIX plane in FIG. 18.

In the sealant applying process performed afterward, as illustrated in FIG. 19, the sealant 40 is applied to the array boards 130 to cover cut end surfaces 36S1 of the gate lines 36G and the source lines 36S that are cut in the cutting process. In FIG. 19, the CF layer including the color filters 22 and the light blocking section 23 is indicated with symbol 120L and the gate lines 36G are not illustrated. In this embodiment, the cut end surfaces 36S1 are covered with the sealant 40. Therefore, even if the array boards 130 are subjected to moisture, the cut end surfaces 36S1 are protected from erosion by the sealant 40. This restricts a decrease in quality reliability of the liquid crystal panels 110 to be produced.

Third Embodiment

A third embodiment will be described with reference to FIGS. 20 to 23. The third embodiment includes a liquid crystal panel 210 included in a liquid crystal display device having configurations, some of which are different from the first embodiment. Furthermore, some processes of a method of producing the liquid crystal display device are different from the first embodiment. Other configurations of the liquid crystal display device and the other processes of the method of producing the liquid crystal display device are similar to those of the first embodiment and thus will not be described.

In the liquid crystal panel 210 in the liquid crystal display device, as illustrated in FIG. 19, the light blocking section 23 is formed in an entire area of a section of a color filter board 220 closer to the first glass substrate 20A and the color filters 22 are formed in a section of the color filter board 220 closer to the liquid crystal layer 18 in a large section of the frame area at the panel sloped sides. Namely, the large section of the frame area at the panel sloped sides is configured as a light blocking area A9. The color filter board 220 having such a configuration may be produced through the following production processes. In the production processes of the color filter board 220, a negative resist film having light blocking properties is formed on the first glass substrate 20A. The resist film is partially and selectively exposed via a photo mask having a pattern corresponding to the pattern of the light blocking section 23 to be formed.

Figure 20:
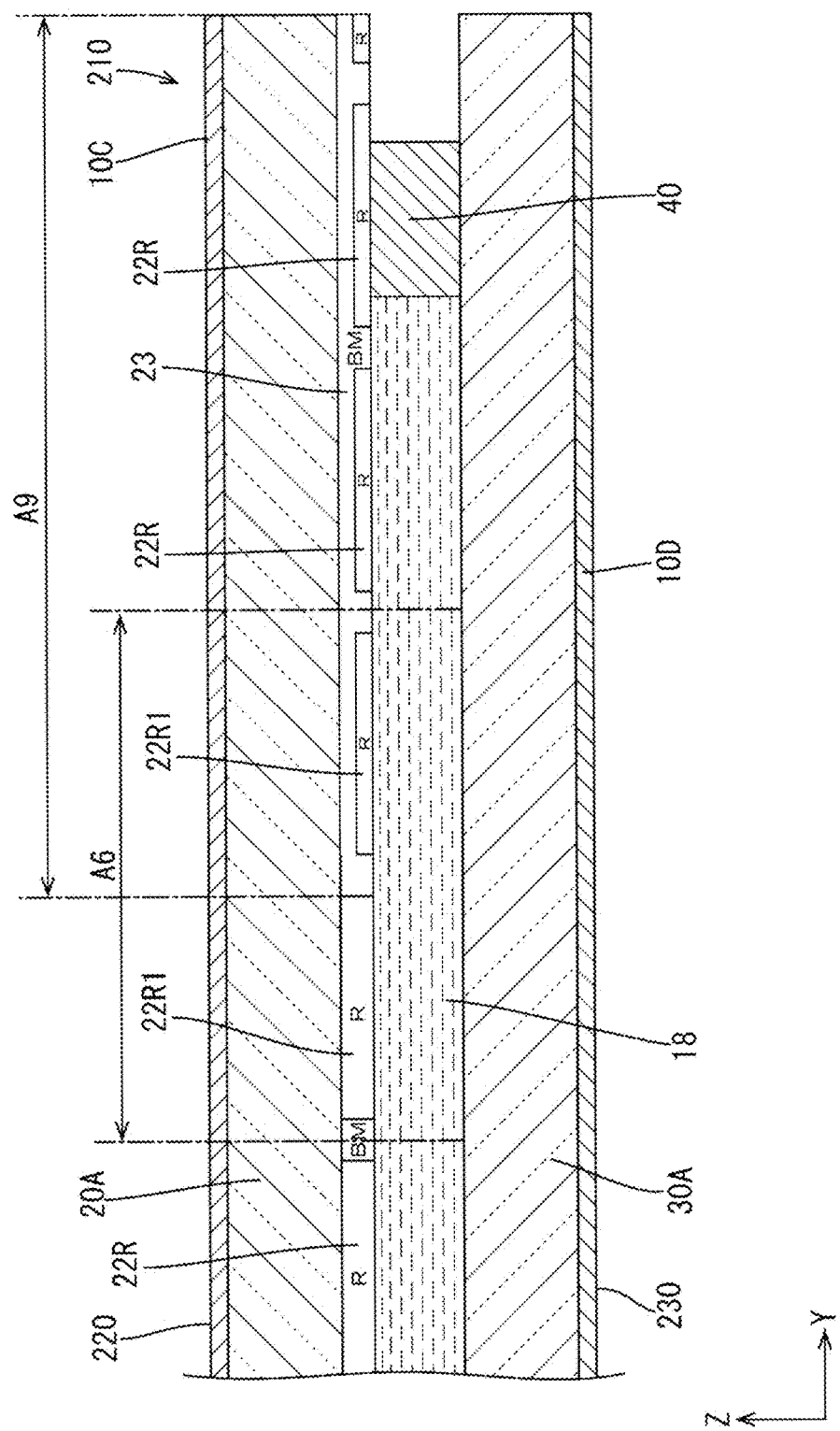
FIG. 20 is a schematic plan view of a liquid crystal panel according to a third embodiment.
Figure 21:
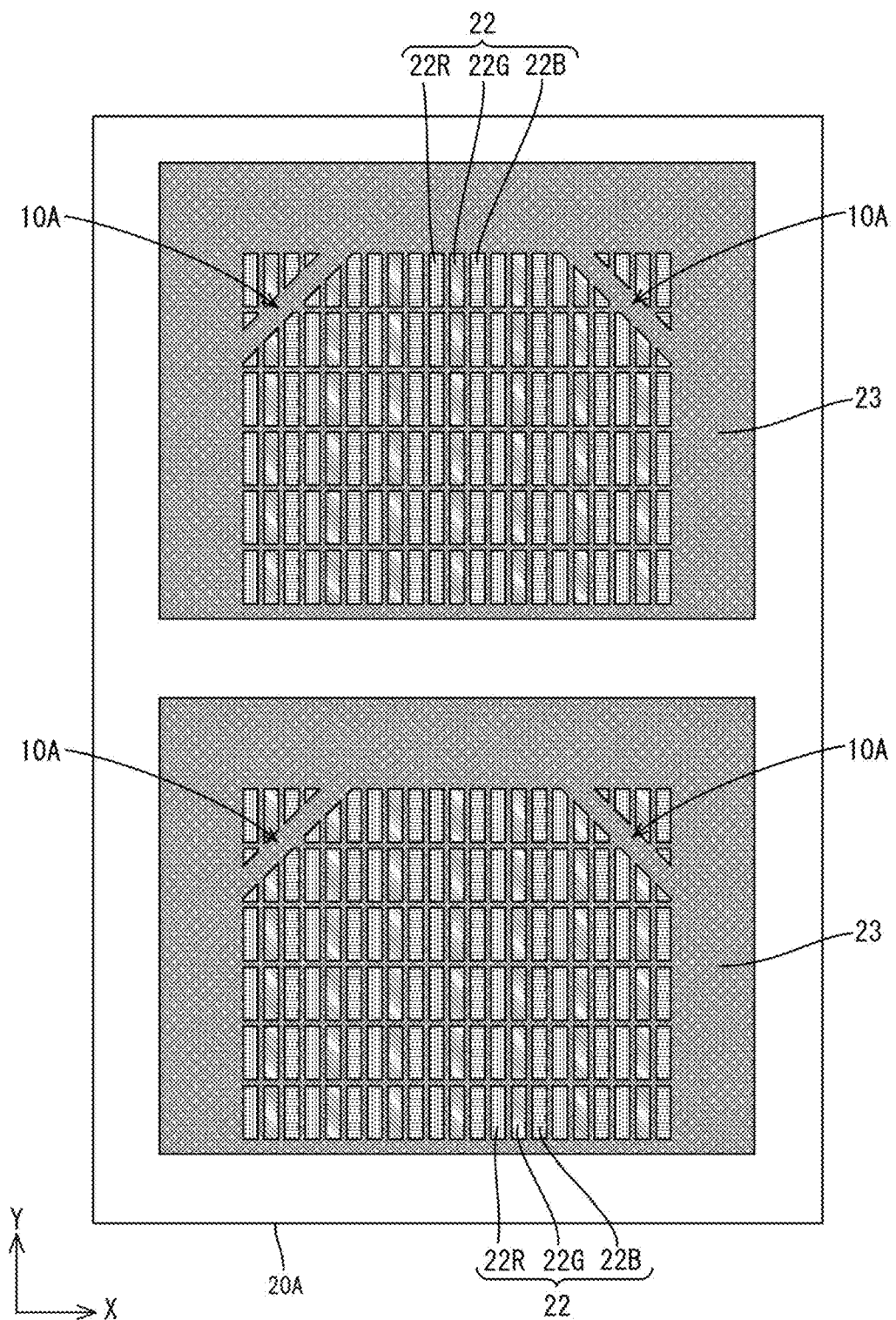
FIG. 21 is a plan view illustrating a liquid crystal panel production process (1).

Light is applied to the resist film and moved along the outline of the liquid crystal panel to be produced. Sections A10 (see FIG. 20) of the resist film, specifically, sections corresponding to the panel sloped sides of the produced liquid crystal panel 210 are selectively exposed. The sections A10 of the resist film corresponding to the panel sloped sides of the produced liquid crystal panel 210 can be exposed without using a photo mask. By developing the resist film, as illustrated in FIG. 20, sections of the resist film which are not exposed are removed to form the pattern of the light blocking section 23 formed from the resist film on the first glass substrate 20A. Then, the processes after the color section forming process are performed in sequence and the color filter board 220 in this embodiment is prepared.

By producing the color filter board 220 with the production method described above, the pattern corresponding to the outline of the color filter board 20 is formed in the section A10 corresponding to the panel sloped sides without using a photo mask. Only one photo mask is required for forming the light blocking section 23 in the pattern corresponding to the requested outline of the color filter board 220 on the first glass substrate 20A. The color filter board 220 with the requested outline can be produced without an increase in the number of required photo masks. Therefore, the production cost can be reduced.

By producing the color filter board 220 with the production method described above, the light blocking section 23, which is a black matrix, is formed on the first glass substrate 20A in the large section of the frame area at the panel sloped sides of the liquid crystal panel 210 through patterning. In the area overlapping the light blocking section 23 formed through patterning by exposing the resist film without using the photo mask, light is blocked by the light blocking section 23. The area is defined as the light blocking area A9. The light blocking area A9 is formed without bonding the light blocking tape to the liquid crystal panel 210 or an increase in the number of photo masks.

Figure 23:
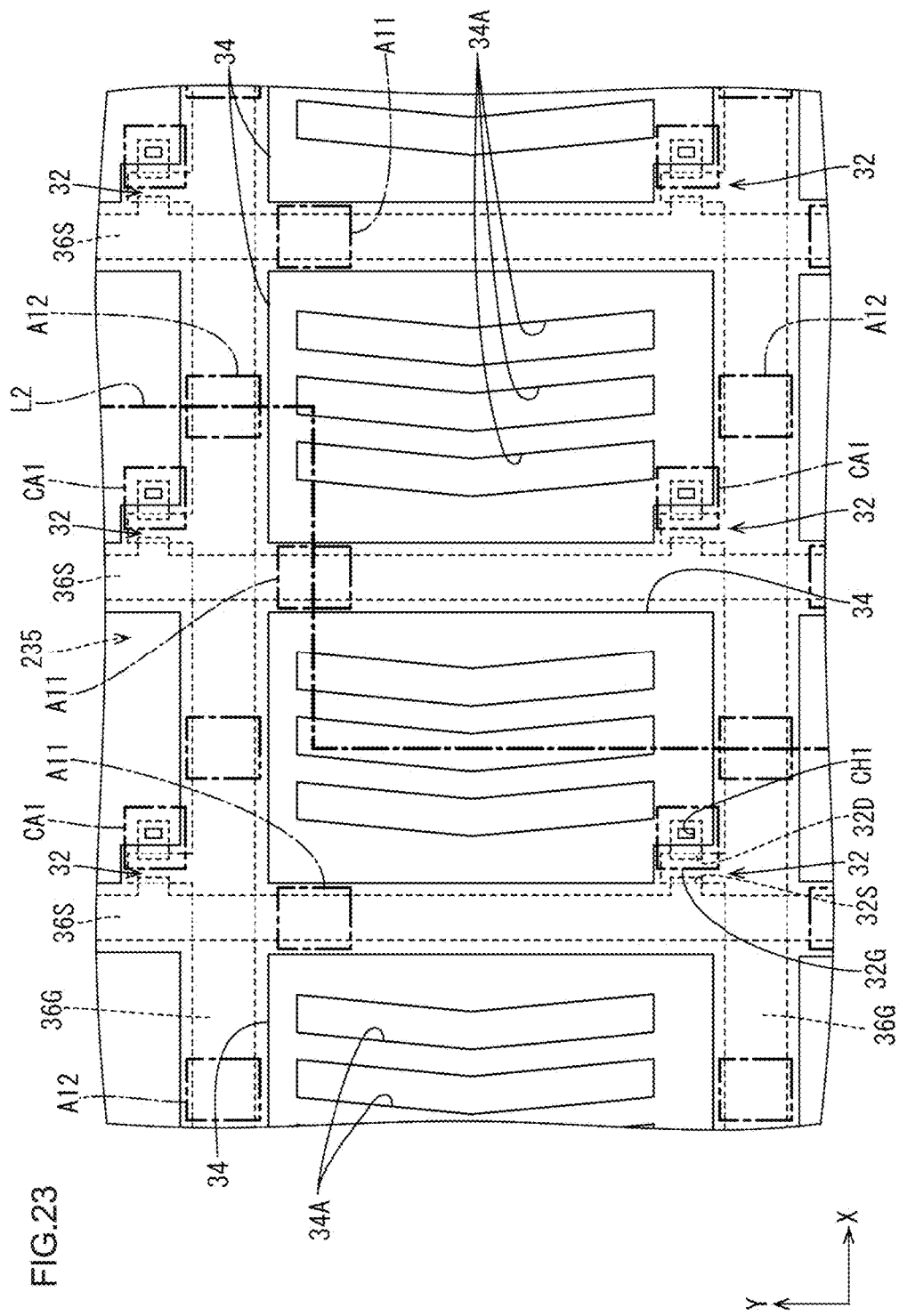
FIG. 23 is a magnified plan view of a section of FIG. 22.

The liquid crystal panel 210 in this embodiment is a normally white type panel that operates in fringe field switching (FFS) mode. As illustrated in FIG. 23, pixel electrodes 34 and common electrodes 235 (an example of planar electrodes) made of transparent electrode material are formed on an array board 30 of a pair of substrates 220 and 230. The common electrodes 235 are formed in a planar pattern (a solid pattern) in a lower layer relative to the pixel electrodes. Specifically, the common electrodes 235 are opposed to the gate lines 36G and the source lines 36S in the thickness direction of the array board 230 (the Z-axis direction) with an insulating film, which is not illustrated, therebetween. The common electrodes 235 are formed in about entire areas in which the source lines 36S are formed and areas in which the gate lines 36G are formed.

As illustrated in FIG. 23, the array board 230 in this embodiment includes contact areas CA1 at positions adjacent to the TFTs 32 including positions overlapping the contact holes CH1. In the contact areas CA1, the common electrodes 235 do not overlap the pixel electrodes 34 in the thickness direction of the array board 230. As illustrated in FIG. 23, the array board 230 in this embodiment includes first non-overlapping areas A11 in which the source lines 36S do not overlap the common electrodes 235 in the thickness direction of the array board 230. The first non-overlapping areas A11 are located at sections of areas in which the source lines 36S are disposed. The first non-overlapping areas A11 are arrange at equal intervals to correspond to the pixel electrodes 34. The array board 230 includes second non-overlapping areas A12 in which the source lines 36S do not overlap the common electrodes 235 in the thickness direction of the array board 230. The second non-overlapping areas A12 are located at sections of areas in which the source lines 36S are disposed. The second non-overlapping areas A12 are arrange at equal intervals to correspond to the pixel electrodes 34.

The liquid crystal panel 210 in this embodiment operates in FFS mode as described earlier. As illustrated in FIG. 23, each pixel electrode 34 includes three elongated slits that includes slightly bending sections surrounded by the gate lines 36G and the source lines 36S (hereinafter referred to as slits 34A). Three slits 34A are formed in every pixel along the source lines 36S to be arranged at predefined intervals. When a voltage difference is created between the pixel electrode 34 and the common electrode 235, a fringe electric field (an oblique electric field) including a component in a direction perpendicular to the plate surface of the array board 30 in addition to a component along the plate surface of the array board 30 is applied to the liquid crystal layer 18 because of the slits 34A of the pixel electrode 34. Switching of orientation of the liquid crystal molecules in the liquid crystal layer 18 above the common electrode 235 in addition to the liquid crystal molecules above the slits 34A can be properly performed. Therefore, an aperture rate of the liquid crystal panel 10 increases and thus a sufficient amount of transmitting light can be achieved and high viewing angle performance can be achieved.

The processes of the method of producing the liquid crystal display device according to this embodiment different from the first embodiment other than the process for forming the light blocking area A9 described above will be described. In the method of producing the liquid crystal display device according to this embodiment, in the pattern forming process of the processes of producing the array board 230, a thin film pattern of the common electrodes 235 are formed while the first non-overlapping area A11 and the second non-overlapping area A12 are maintained. In the cutting process, the scan width of applying laser beam is reduced in comparison to the first embodiment and the second embodiment. In the area inside the profile line L1 that forms the outline of the liquid crystal panel 210 to be produced, the laser beam is applied and moved along the outline in a scan path (indicated with a chain line with symbol L2 in FIG. 22 and FIG. 23) such that the laser beam passes the first non-overlapping area A11 to cut the source lines 36S and the second non-overlapping area A12 to cut the gate lines 36G.

Figure 22:
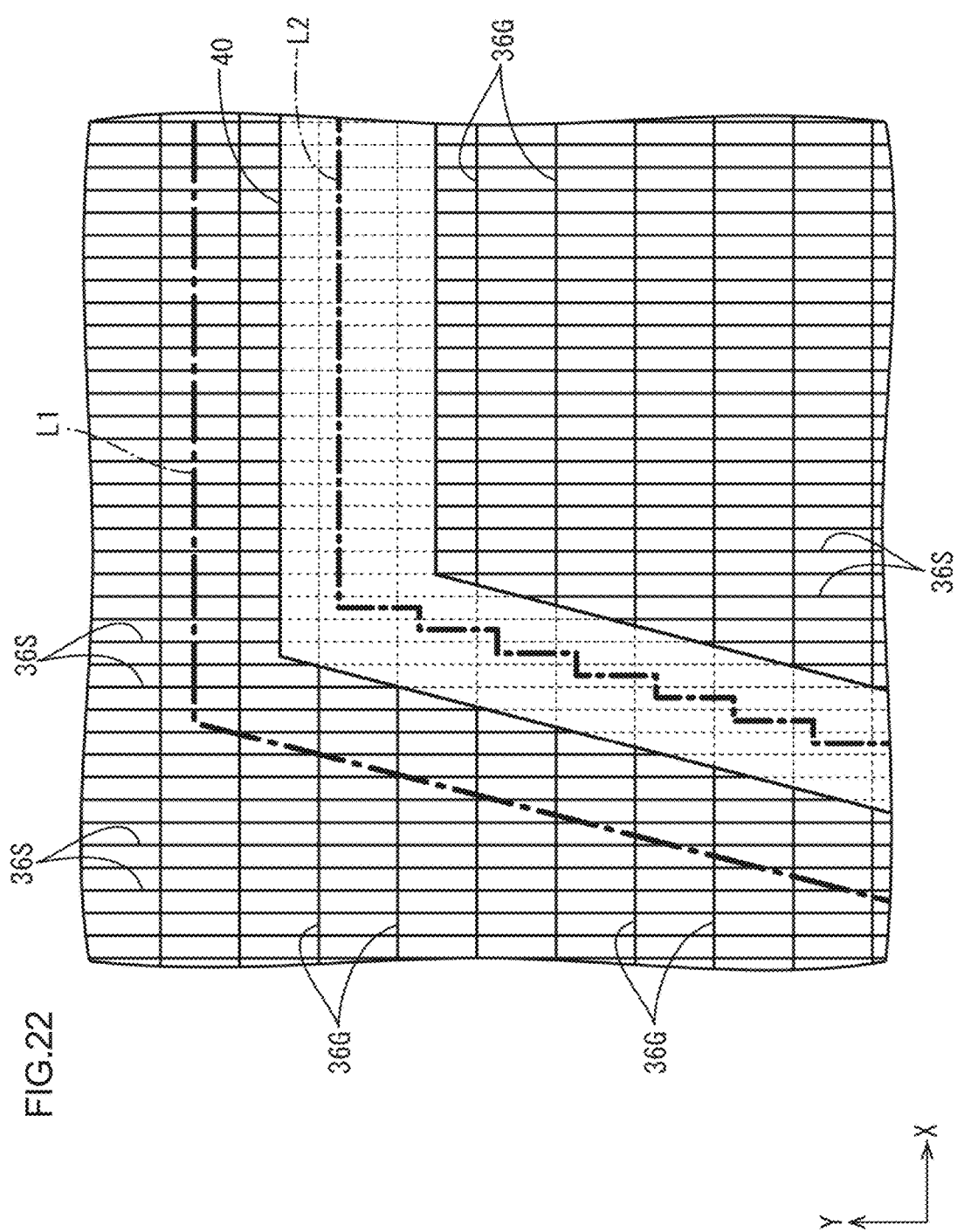
FIG. 22 is a plan view illustrating a liquid crystal panel production process (2).

By applying the laser beam as described above in the cutting process, the scan path of the laser beam forms steps in the plan view in the sections inside the panel sloped sides of the liquid crystal panel 210 to be produced as illustrated in FIGS. 22 and 23. The cutting process in this embodiment may be performed after the bonding process as in the first embodiment. Alternatively, as illustrated in FIG. 22, the cutting process may be performed before the bonding process as in the second embodiment and the sealant 40 may be applied to the array board 130 to cover the cut end surfaces 36S1 of the gate lines 36G and the source lines 36S that are cut in the cutting process.

In the cutting process, an instantaneous drop may occur in output of the laser beam in some areas according to positions to which the laser beam is applied or variation in output of the laser beam. Sections of the gate lines 36G and the source lines 36S located in the areas in which the output of the laser beam has been dropped may be only melted but not cut during the cutting of the gate lines 36G and the source lines 36S with the laser beam. A short circuit may be developed between the common electrode 235 and the gate lines 36G or the source lines 36S resulting in a decrease in quality reliability of the display device to be produced.

In the cutting process of the method of producing the liquid crystal display device according to this embodiment, the laser beam is applied and moved in the scan path such that the laser beam passes the first non-overlapping area A11 to cut the source lines 36S and the second non-overlapping area A12 to cut the gate lines 36G. Even if the lines are melted to cut the gate lines and the source lines with the laser beam in the cutting process, a short circuit is less likely to be developed between each line and the planar electrode. Therefore, the decrease in the quality reliability of the liquid crystal display device to be produced due to the short circuit developed between each of the lines 36S and 36G and the planar electrode can be restricted while restricting the short circuit of the lines 36S and 36G outside the sealant 40.

Modifications of the above embodiments are listed below.

(1) In each of the above embodiments, each display pixel has the configuration including a set of the red color section, the green color section, and the blue color section. However, the display pixel is not limited to such a configuration. For example, each display pixel may include a yellow color section in addition to those color sections.

(2) In the first embodiment, the laser beam is applied such that both cut end surfaces created through the cutting in the cutting process are located inside the profile line to form the outline of the liquid crystal panel to be produced. However, the laser beam may be applied such that only one of the cut end surfaces located on an inner side is located inside the profile line.

(3) In the second embodiment, both cut end surfaces creased through the cutting in the cutting process are covered with the sealant. However, only one of the cut end surfaces located on an inner side may be covered with the sealant because erosion that may occur in the cut surface located on an outer side does not affect the display quality of the liquid crystal panel to be produced.

(4) In each of the above embodiments, the semiconductor film that forms the TFTs is formed from the In—Ga—Zn—O based semiconductor. However the semiconductor film is not limited to that. For example, the semiconductor film that forms the TFTs may be formed from poly silicon or continuous grain silicon.

(5) In each of the above embodiments, the liquid crystal panel operates in twisted nematic mode or fringe field switching (FFS) ode. However, the operation mode is not limited to those. For example, liquid crystal panels may operate in vertical alignment (VA) mode and in-plane switching (IPS) mode.

(6) In each of the above embodiment sections, the liquid crystal display device is described as a display device. However, the display device is not limited to that. For example, the present invention may be applied to a production process for producing circuit boards for organic EL display devices. In this case, the organic EL display panel may be driven such that light emitting components that overlap the color section that do not form the display pixels among the color sections adjacent to the light blocking area. According to the configuration, the color sections that do not form the display pixels remain in the black state.

(7) In each of the above embodiment sections, the normally white type liquid crystal panel is described. The liquid crystal panel may be a normally black type liquid crystal panel in which sections of a liquid crystal layer to which a voltage is not applied have the lowest transmissivity.

The embodiments are described in detail. However, the embodiments are only examples and not limit claims. Technologies described in the claims in include modifications and alteration of the embodiments.

EXPLANATION OF SYMBOLS

1: Liquid crystal display device
2: Backlight unit
4: Light guide plate
5: Optical sheet set
6: Reflection sheet
7: Chassis
9: Light blocking tape
10, 110, 210: Liquid crystal panel
11: Panel sloped side
12: IC chip
14: Flexible circuit board
16: Control circuit board
17: Gate driver
18: Liquid crystal layer
20, 120, 220: Color filter board
20A: First glass substrate
22: Color filter
22R: Red color section
22G: Green color section
22B: Blue color section
22D: Color section in a black state
23: Light blocking section
24, 235: Common electrode
30, 130, 230: Array board
30A: Second glass substrate
30L: Thin film patterns
32: TFT
32G: Gate electrode
32S: Source electrode
32D: Drain electrode
34: Pixel electrode
34A: Slit opening
36G: Gate line
36S: Source line
36S1: Cut end surface
38: Semiconductor film
39: Interlayer insulating film
40: Sealant
150: Bonded board
A1: Display area
A2: Non-display area
A3: Frame area
A4, A9: Light blocking area
A5: Alignment failure area
A6: Black state area
A7: Section between an outline and a sealant
A8: Section overlapping an area to which sealant is applied
A10: Section corresponding to the panel sloped side
A11: First non-overlapping area
A12: Second non-overlapping area
CA1: Contact area
CH1: Contact hole
L1: Profile line
L2: Scan path
N: Refractive index of array board
T1: Thickness of array board
W1: Width of a section of black state area not overlapping the light blocking area
W2: Width of black state area
θ: Maximum viewing angle of panel surface

The invention claimed is:

1. A method of driving a display device including a display panel including a color filter board, the color filter board including a light blocking section formed in a grid and multiple colors of color sections formed in areas surrounded by a pattern of the light blocking section in different colors from area to area, sets of the color sections form display pixels, respectively, the display panel including a light blocking area formed in at least a section of an edge of the display panel along an outline of the display panel, the method comprising:

setting the color sections not forming the display pixels among the color sections adjacent to the light blocking area constantly in a black state; wherein the display panel includes the color filter board, an array board including thin film transistors, and a liquid crystal layer between the color filter board and the array board, the display device includes a voltage applying section configured to apply a voltage to the liquid crystal layer and a voltage controlling section configured to control the voltage, transmissivity of a section of the liquid crystal layer overlapping the color sections in the black state in a thickness direction of the display panel is minimized by applying a voltage to the liquid crystal layer by the voltage applying section and by controlling the voltage applied to the section by the voltage control section, and when a maximum angle among angles relative to a line normal to a panel surface of the display panel at which a displayed image can be viewed is defined as θ, a width of a section of a black state area not overlapping the light blocking area in the thickness direction of the display panel is defined as W1, a width of the black state area is defined as W2, and a refractive index and the thickness of the array board are defined as N and T1, respectively, the display panel satisfies such that the following formulas (1) and (2):

$$W1 \geq T1 \cdot \tan(\sin^{-1}(\sin \theta / N)) \quad (1)$$

$$W2 \geq W1 \quad (2).$$

2. The method of driving the display device according to claim 1, wherein the light blocking area of the display device is formed by bonding a light blocking member to a section of a panel surface of the display panel overlapping the light blocking area in a thickness direction of the display panel.

3. The method of driving the display device according to claim 1, wherein the light blocking area of the display device is formed by disposing a black matrix in a section of the color filer board overlapping the light blocking area in the thickness direction of the display panel.

4. A method of producing the display device driven by the method of driving the display device according to claim 1, the method comprising a removing process including applying a laser beam to a section of a substrate included in the color filter board to remove the color sections formed in the section of the substrate to which the laser beam is applied among the color sections formed on the substrate.

5. A method of producing the display device driven by the method of driving the display device according to claim 1, the method comprising:

a bonding process including bonding the color filter board and the array board with a sealant; and a cutting process performed after the bonding process including cutting lines for driving the thin film transistors by applying a laser beam to the lines and moving the laser beam at least in a section of the array board of a bonded board between a profile line of the display panel to form an outline of the display panel to be produced and the sealant.

6. A method of producing the display device according to claim 5, further comprising a pattern forming process including forming a thin film pattern of gate lines including gate electrodes of the thin film transistors, a thin film pattern of source lines including source electrodes of the thin film transistors, and a thin fil pattern of planar electrodes having a planar shape and being opposed to the gate lines and the source lines in a thickness direction of the array board via an insulating film, wherein in the pattern forming process, the thin film pattern of the planar electrodes is formed while a first non-overlapping area in which the source lines do not overlap the planar electrodes in a thickness direction of the array board among the section in which the source lines are disposed and a second non-overlapping area in which the gate lines do not overlap the planar electrodes in the thickness direction of the array board among the section in which the gate lines are disposed are maintained, the source lines and the gate lines are the lines cut in the cutting process, and in the cutting process, the laser beam is moved in a scan path to pass the first non-overlapping area to cut the source lines and to pass the second non-overlapping area to cut the gate lines.

7. A method of producing the display device driven by the method of driving the display device according to claim 1, the method comprising:

a cutting process including cutting lines for driving the thin film transistors by applying a laser beam to the lines and moving the laser beam at least in a section inside a profile line along an outline of the display panel to be produced; and a bonding process performed after the cutting process including preparing a bonded board by applying a sealant onto the array board to cover cut end surfaces of the lines cut in the cutting process and bonding the color filter board and the array board together with the sealant.

* * * * *